US011472916B2

(12) United States Patent
Guironnet et al.

(10) Patent No.: US 11,472,916 B2
(45) Date of Patent: Oct. 18, 2022

(54) FLOW CONTROLLED SYNTHESIS OF BOTTLEBRUSH MACROMOLECULES

(71) Applicant: The Board of Trustees of the University of Illinois, Urbana, IL (US)

(72) Inventors: Damien S. Guironnet, Urbana, IL (US); Dylan J. Walsh, Sun Prairie, WI (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 114 days.

(21) Appl. No.: 16/962,142

(22) PCT Filed: Dec. 11, 2018

(86) PCT No.: PCT/US2018/064939
§ 371 (c)(1),
(2) Date: Jul. 14, 2020

(87) PCT Pub. No.: WO2019/143423
PCT Pub. Date: Jul. 25, 2019

(65) Prior Publication Data
US 2020/0407488 A1 Dec. 31, 2020

Related U.S. Application Data

(60) Provisional application No. 62/618,290, filed on Jan. 17, 2018.

(51) Int. Cl.
C08G 61/08 (2006.01)
C08F 2/06 (2006.01)
(Continued)

(52) U.S. Cl.
CPC ............... *C08G 61/08* (2013.01); *C08F 2/06* (2013.01); *C08F 4/52* (2013.01); *C08F 4/78* (2013.01);
(Continued)

(58) Field of Classification Search
CPC .............. C08G 61/08; C08G 2261/136; C08G 2261/3324; C08G 2261/354
See application file for complete search history.

(56) References Cited

U.S. PATENT DOCUMENTS 9,228,050 B2 1/2016 Boday et al.
10,072,121 B1 9/2018 Kobilka et al.
(Continued)

FOREIGN PATENT DOCUMENTS

CN 102311526 A 1/2012
WO 2014120433 A1 8/2014
WO 2017181274 A1 10/2017

OTHER PUBLICATIONS

Daniel et al., "Solvent-free, Supersoft and Superelastic Bottlebrush Melts and Networks," Nature Mater., 15:183-189, Feb. 2016.
(Continued)

*Primary Examiner* — Catherine S Branch
(74) *Attorney, Agent, or Firm* — Haukaas Fortius PLLC; Michael H. Haukaas

(57) ABSTRACT

Shape, size and composition are nature's most fundamental design features, enabling highly complex functionalities. Despite recent advances, the independent control of shape, size and chemistry of macromolecules remains a synthetic challenge. Herein reported is a scalable methodology to produce large well-defined macromolecules with programmable shape, size and chemistry that combines reactor engineering principles and controlled polymerizations. Specifically, bottlebrush polymers with conical, ellipsoidal and concave architectures are synthesized using two orthogonal polymerizations. The chemical versatility is highlighted by the synthesis of a compositional asymmetric cone. The strong agreement between predictions and experiments validate the precision that this methodology offers.

18 Claims, 12 Drawing Sheets

(51) Int. Cl.
*C08F 4/52* (2006.01)
*C08F 4/78* (2006.01)

(52) U.S. Cl.
CPC . *C08G 2261/136* (2013.01); *C08G 2261/144* (2013.01); *C08G 2261/1426* (2013.01); *C08G 2261/3324* (2013.01); *C08G 2261/354* (2013.01)

(56) References Cited

U.S. PATENT DOCUMENTS

| | | |
|---|---|---|
| 10,105,449 B2 | 10/2018 | Johnson et al. |
| 2011/0294960 A1 | 12/2011 | Hillmyer et al. |
| 2014/0142249 A1 | 5/2014 | Cho et al. |
| 2016/0024246 A1 | 1/2016 | Mahanthappa et al. |
| 2018/0094099 A1 | 4/2018 | Johnson et al. |
| 2018/0312634 A1 | 11/2018 | Chung |

OTHER PUBLICATIONS

International Search Report and Written Opinion of the ISA/US dated Mar. 4, 2019 in PCT/US2018/064939; 6pgs.
Kawamoto et al., "Graft-through Synthesis and Assembly of Janus Bottlebrush Polymers from A-Branch-B Diblock Macromonomers," J Am Chem Soc., 138(36):11501-11504, Sep. 2016.
Li et al., "Facile Synthesis and Visualization of Janus Double-Brush Copolymers," ACS Macro Lett., 1(1):52-56, Jan. 2012.
Lin et al., "Control of Grafting Density and Distribution in Graft Polymers by Living Ring-Opening Metathesis Copolymerization," J Am Chem Soc., 139(10):3896-3903, Mar. 2017.
Müllner et al., "Size and Rigidity of Cylindrical Polymer Brushes Dictate Long Circulating Properties In Vivo," ACS Nano., 9(2):1294-1304, Feb. 2015.
Pelras et al., "Synthesis and Applications of Compartmentalised Molecular Polymer Brushes," Angew Chem Int Ed Engl., 57(24):6982-6994, Jun. 2018.
Radzinski et al., "Tapered Bottlebrush Polymers: Cone-Shaped Nanostructures by Sequential Addition of Macromonomers," ACS Macro Lett., 6(10):1175-1179, Oct. 2017.
Walsh et al., "Kinetic Study of Living Ring-Opening Metathesis Polymerization with Third-Generation Grubbs Catalysts," J Am Chem Soc., 139(39):13644-13647, Oct. 2017.
Yang et al., "Surface-Engineered Dendrimers in Gene Delivery," Chem Rev., 115(11):5274-5300, Jun. 2015.

FLOW CONTROLLED SYNTHESIS OF BOTTLEBRUSH MACROMOLECULES

RELATED APPLICATIONS

This application is a National Stage filing under 35 U.S.C. 0 371 of International Application No. PCT/US2018/064939 filed Dec. 11, 2018, which claims priority under 35 U.S.C. § 119(e) to U.S. Provisional Patent Application No. 62/618, 290, filed Jan. 17, 2018, which applications are incorporated herein by reference.

BACKGROUND OF THE INVENTION

Nature tunes the shape, size and chemical composition of molecules, viruses, bacteria and other biological structures as a way to mediate function. This can be seen in the shape of viruses (ex. conical shape of HIV-1 capsid or the bullet shape of a rabies related virus), in which the virulence is dictated by the shape of the pathogen, or in antibodies where complementary antigen targets in specific locations are required for activity. Inspired by nature's ability to control function through structure, scientists have developed various synthetic strategies to control the shape, size and chemistry of nanomaterials. Most notably, advancements in colloidal particle synthesis have enabled the tuning of physical, electrical and chemical properties of inorganic nanomaterials by varying their shape, size and composition. Today, these hard particles find diverse applications varying from quantum dots for portable displays to biological systems for imaging, detecting and treating diseases. In soft materials, the independent control of shape, size and composition of macromolecules remains non-trivial, which limits overall the ability to realize and mediate advance functionalities.

Dendrimers and hyperbranched polymers have been synthesized with some tunability. Low generation dendrons (~5 nm) with variable shapes and chemistries have been synthesized, and modification of their composition was shown to provide a unique control on their molecular assemblies. High generation dendrimers of variable size (up to 30 nm) and chemistry, but fixed shape (spherical) have been intensely investigated over the years in drug delivery, gene transfection and imaging. Recently, cylindrical-shaped macromolecules with variable size (up to 1000 nm) and chemistry have been accessed through the synthesis of high graft density branched polymers called bottlebrush polymers. The steric encumbrance of the densely packed brushes forces the polymer to adopt a semi-rigid 3D cylindrical conformation. Sequenced graft-through polymerization of macromonomers with different lengths has been implemented to reach a limited number of blocky shapes. The potential of these materials is highlighted by the wide range of available chemistries that have been applied to the synthesis and functionalization of bottlebrush polymers, which have translated into remarkable attributes for drug delivery, bio-mimicry, photonic materials and soft elastomers.

The problem is there are no practical methods that can be used to prepare bottlebrush polymers of various configurations. Accordingly, there is a need for a method that can predictably and reliably be tuned to provide bottlebrush polymers that are otherwise difficult to obtain.

SUMMARY

Herein is presented a methodology for the synthesis of bottlebrush polymers with programmable shape, size and chemistry. Bottlebrush polymers with conical, ellipsoidal and concave architectures (FIG. 1, bottom) are synthesized with a size up to 300 nanometers using ring opening polymerization (ROP) in tandem with ring opening metathesis polymerization (ROMP) on gram scale. The essence of shape stems from varying the brush length along the polymer backbone, which is achieved by varying the rate of addition of the growing macromonomer solution into a graft-through polymerization (semi-batch set-up, FIG. 1, top). Beyond the control of shape and size, this approach is compatible with a variety of chemistries; as exemplified by the synthesis of a compositionally asymmetric cone containing both asymmetric shape and chemical contrast within a single macromolecule. Accordingly, this disclosure provides a method of preparing a bottlebrush copolymer comprising:

a) growing a macromonomer in a first mixture, wherein the macromonomer is covalently bonded to a ring-strained cyclic olefin, the macromonomer is formed via a controlled polymerization (CP), and the macromonomer has a molecular weight that grows with time;

b) feeding the first mixture into a second mixture via a semi-batch process, wherein the second mixture comprises a ROMP catalyst and a CP quenching agent, and the first and second mixture form a living copolymer via grafting-through ring opening olefin metathesis polymerization (ROMP); and c) quenching the living copolymer thereby providing a bottlebrush copolymer having a bottlebrush architecture;

wherein the molecular weight of the macromonomer continues to grow until it is quenched by the CP quenching agent, and the living copolymer has a molecular weight that continues to grow when fed the macromonomer.

This disclosure also provides a method of preparing a bottlebrush copolymer comprising:

a) contacting a first mixture of monomers with a varying amount of an CP catalyst in a plug-flow reactor to form a macromonomer, wherein the macromonomer is covalently bonded to a ring-strained cyclic olefin, and the macromonomer is formed via a controlled polymerization (CP);

wherein the amount of CP catalyst that contacts the first mixture is increased or decreased at the time during contact;

b) allowing the macromonomer to grow wherein the molecular weight of the macromonomer is dependent on the amount of the CP catalyst contacting the first mixture at the time during contact while traversing the reactor, thereby forming macromonomers having different molecular weights at different points in time;

c) feeding macromonomers from the reactor into a second mixture via a semi-batch process wherein the second mixture comprises a ROMP catalyst and a CP quenching agent, and first and second mixture form a living copolymer via grafting-through ring opening olefin metathesis polymerization (ROMP); and d) quenching the living copolymer thereby providing a bottlebrush copolymer having a bottlebrush architecture;

wherein the molecular weight of the macromonomer continues to grow until it is quenched by the CP quenching agent, and the living copolymer has a molecular weight that continues to grow when fed the macromonomer.

Additionally, this disclosure provides a macromolecule comprising Formula I:

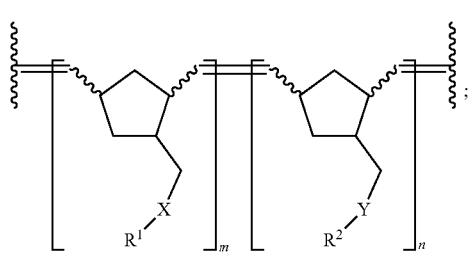

wherein the macromolecule of Formula I has a bottlebrush configuration that is non-cylindrical;

each double bond independently has a cis- or trans-configuration;

$R^1$ and $R^2$ independently comprise Formula IA or Formula IB:

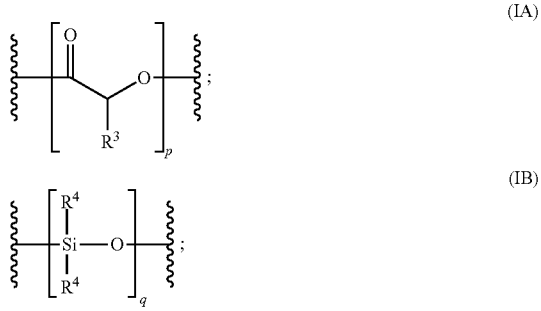

wherein $R^3$ and $R^4$ are independently —($C_1$-$C_6$)alkyl; and p and q are independently 1-10,000;

wherein p and q are different for about every 8 or less monomer units (m+n) of Formula I;

X and Y are independently N, O or S, and form a direct bond to the initial carbonyl moiety of Formula IA or the initial silicon atom of Formula IB;

m is 10-100,000; and n is 0-100,000;

wherein monomer unit m and monomer unit n are alternating when n is not 0; and wherein the macromolecule has a dispersity index of about 1.01 to about 1.25.

Furthermore, this disclosure provides novel compounds of Formula I, intermediates for the synthesis of compounds of Formula I, as well as methods of preparing compounds of Formula I. The invention also provides compounds of Formula I that are useful as intermediates for the synthesis of other useful compounds.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1:
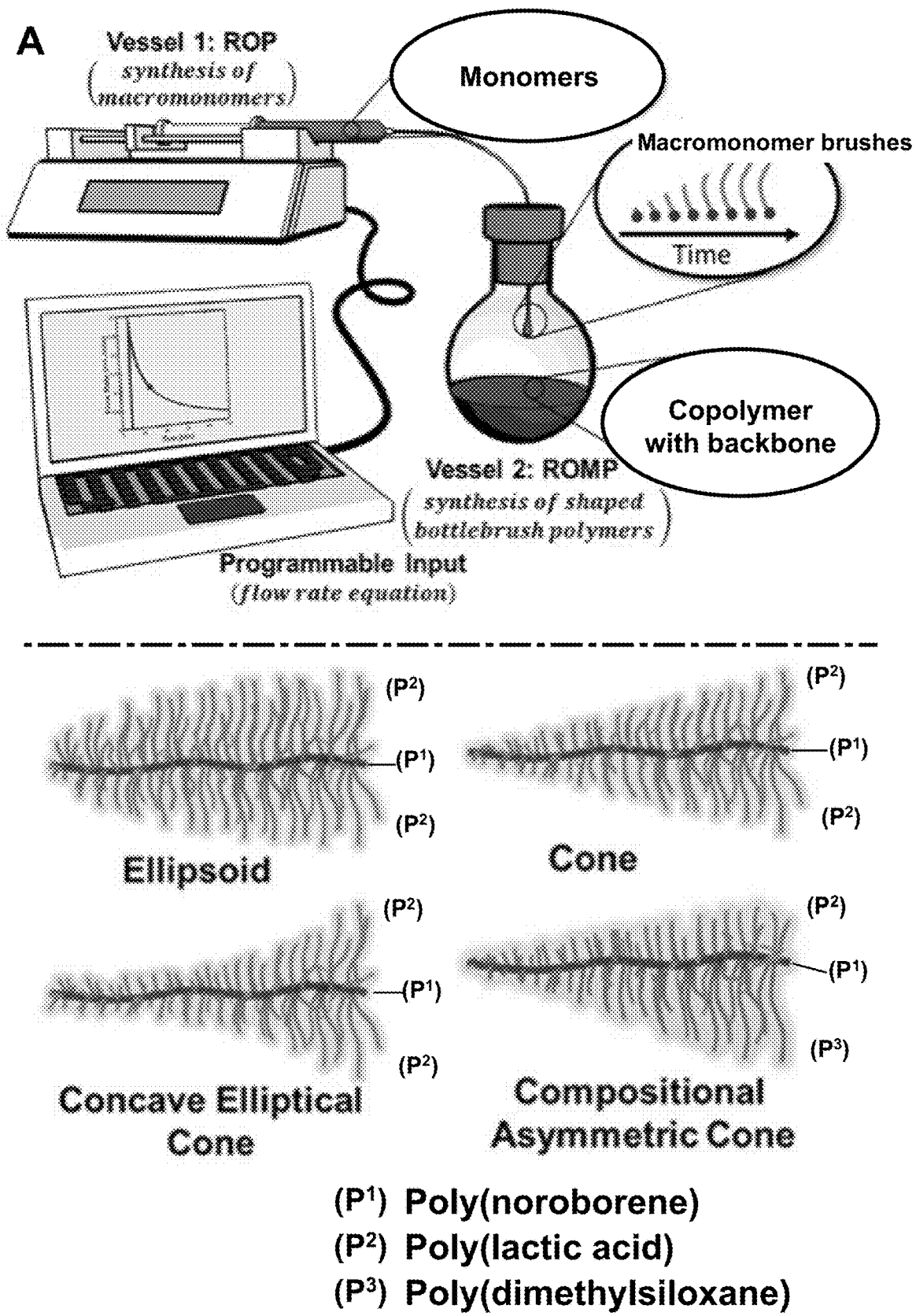
FIG. 1. A) (top) Schematic of the programmable semi-batch reactor system. (bottom) Shaped bottlebrush polymers. B) Semibatch method for dual macromonomer feed.
Figure 1:
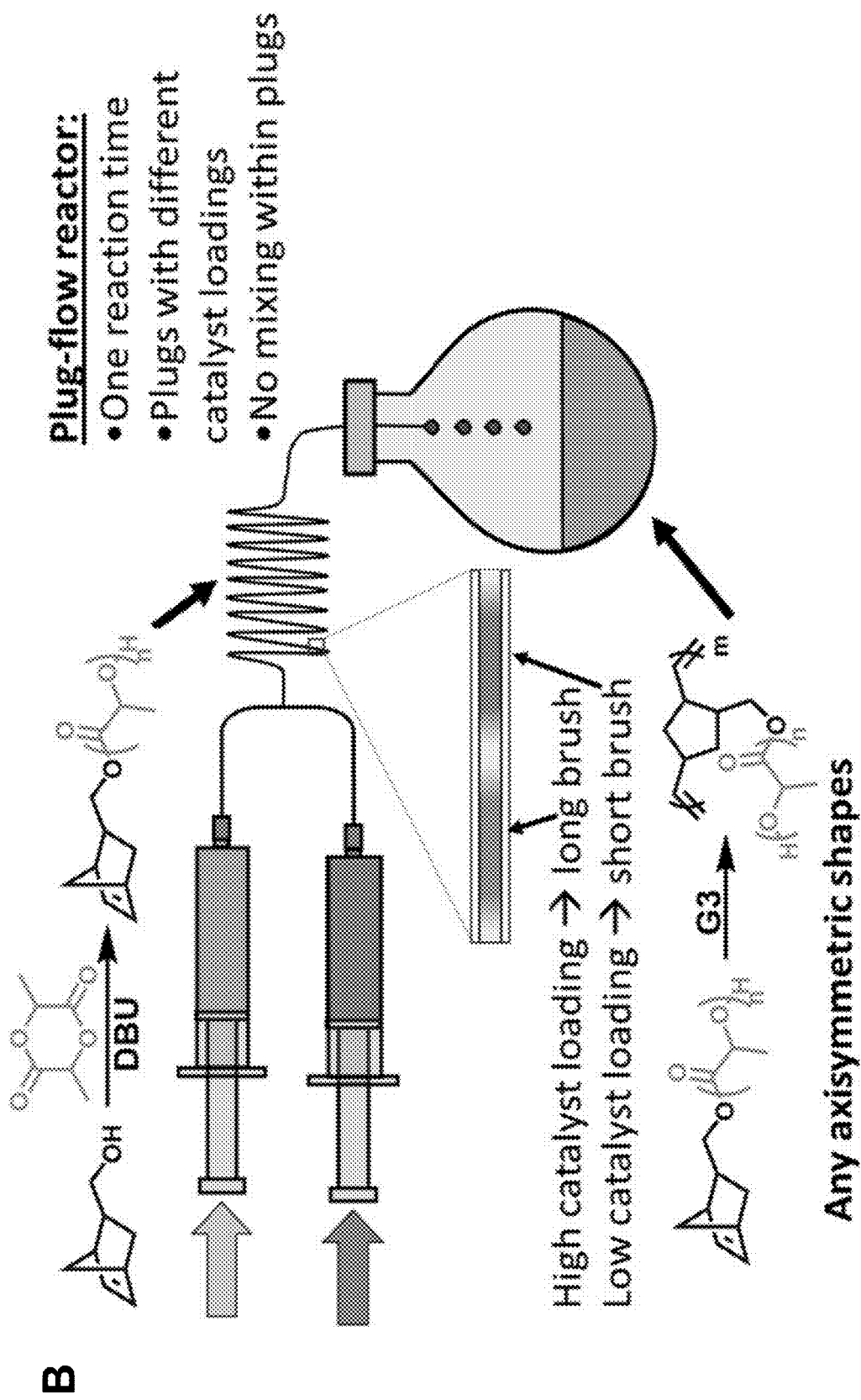

Nature tunes shape, size and chemical composition to mediate function. In soft materials, the establishment of these structure-function relationships has been hampered by the inability to independently control the shape, size and composition of macromolecules. Herein is established a novel synthetic methodology combining a computer-controlled process and two controlled polymerizations to yield macromolecules with any monotonic axisymmetric shape up to 300 nm in size. The methodology has a simple and scalable setup to yield gram quantities of macromolecules from commercially-available materials. This approach provides a unique material platform to study the impact of shape, size and composition of macromolecules.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* 14th Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture.

The term "substantially" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

This disclosure provides methods of making the compounds and compositions of the invention. The compounds and compositions can be prepared by any of the applicable techniques described herein, optionally in combination with standard techniques of organic synthesis. Many techniques such as etherification and esterification are well known in the art. However, many of these techniques are elaborated in Compendium of Organic Synthetic Methods (John Wiley & Sons, New York), Vol. 1, Ian T. Harrison and Shuyen Harrison, 1971; Vol. 2, Ian T. Harrison and Shuyen Harrison, 1974; Vol. 3, Louis S. Hegedus and Leroy Wade, 1977; Vol. 4, Leroy G. Wade, Jr., 1980; Vol. 5, Leroy G. Wade, Jr., 1984; and Vol. 6; as well as standard organic reference texts such as March's Advanced Organic Chemistry: Reactions, Mechanisms, and Structure, 5th Ed., by M. B. Smith and J. March (John Wiley & Sons, New York, 2001); Comprehensive Organic Synthesis. Selectivity, Strategy & Efficiency in Modern Organic Chemistry. In 9 Volumes, Barry M. Trost, Editor-in-Chief (Pergamon Press, New York, 1993 printing); Advanced Organic Chemistry, Part B: Reactions and Synthesis, Second Edition, Cary and Sundberg (1983);

The formulas and compounds described herein can be modified using protecting groups. Suitable amino and carboxy protecting groups are known to those skilled in the art (see for example, Protecting Groups in Organic Synthesis, Second Edition, Greene, T. W., and Wutz, P. G. M., John Wiley & Sons, New York, and references cited therein; Philip J. Kocienski; Protecting Groups (Georg Thieme Verlag Stuttgart, New York, 1994), and references cited therein); and Comprehensive Organic Transformations, Larock, R. C., Second Edition, John Wiley & Sons, New York (1999), and referenced cited therein.

As used herein, the term "substituted" or "substituent" is intended to indicate that one or more (for example, 1-20 in various embodiments, 1-10 in other embodiments, 1, 2, 3, 4, or 5; in some embodiments 1, 2, or 3; and in other embodiments 1 or 2) hydrogens on the group indicated in the expression using "substituted" (or "substituent") is replaced with a selection from the indicated group(s), or with a suitable group known to those of skill in the art, provided that the indicated atom's normal valency is not exceeded, and that the substitution results in a stable compound. Suitable indicated groups include, e.g., alkyl, alkenyl, alkynyl, alkoxy, halo, haloalkyl, hydroxy, hydroxyalkyl, aryl, heteroaryl, heterocycle, cycloalkyl, alkanoyl, alkoxycarbonyl, amino, alkylamino, dialkylamino, trifluoromethylthio, difluoromethyl, acylamino, nitro, trifluoromethyl, trifluoromethoxy, carboxy, carboxyalkyl, keto, thioxo, alkylthio, alkylsulfinyl, alkylsulfonyl, and cyano.

The term "halo" or "halide" refers to fluoro, chloro, bromo, or iodo. Similarly, the term "halogen" refers to fluorine, chlorine, bromine, and iodine.

The term "alkyl" refers to a branched or unbranched hydrocarbon having, for example, from 1-20 carbon atoms, and often 1-12, 1-10, 1-8, 1-6, or 1-4 carbon atoms. As used herein, the term "alkyl" also encompasses a "cycloalkyl", defined below. Examples include, but are not limited to, methyl, ethyl, 1-propyl, 2-propyl (iso-propyl), 1-butyl, 2-methyl-1-propyl (isobutyl), 2-butyl (sec-butyl), 2-methyl-2-propyl (t-butyl), 1-pentyl, 2-pentyl, 3-pentyl, 2-methyl-2-butyl, 3-methyl-2-butyl, 3-methyl-1-butyl, 2-methyl-1-butyl, 1-hexyl, 2-hexyl, 3-hexyl, 2-methyl-2-pentyl, 3-methyl-2-pentyl, 4-methyl-2-pentyl, 3-methyl-3-pentyl, 2-methyl-3-pentyl, 2,3-dimethyl-2-butyl, 3,3-dimethyl-2-butyl, hexyl, octyl, decyl, dodecyl, and the like. The alkyl can be unsubstituted or substituted, for example, with a substituent described below. The alkyl can also be optionally partially or fully unsaturated. As such, the recitation of an alkyl group can include both alkenyl and alkynyl groups. The alkyl can be a monovalent hydrocarbon radical, as described and exemplified above, or it can be a divalent hydrocarbon radical (i.e., an alkylene).

The term "cycloalkyl" refers to cyclic alkyl groups of, for example, from 3 to 10 carbon atoms having a single cyclic ring or multiple condensed rings. Cycloalkyl groups include, by way of example, single ring structures such as cyclopropyl, cyclobutyl, cyclopentyl, cyclooctyl, and the like, or multiple ring structures such as adamantyl, and the like. The cycloalkyl can be unsubstituted or substituted. The cycloalkyl group can be monovalent or divalent, and can be optionally substituted as described for alkyl groups. The cycloalkyl group can optionally include one or more cites of unsaturation, for example, the cycloalkyl group can include one or more carbon-carbon double bonds, such as, for example, 1-cyclopent-1-enyl, 1-cyclopent-2-enyl, 1-cyclopent-3-enyl, cyclohexyl, 1-cyclohex-1-enyl, 1-cyclohex-2-enyl, 1-cyclohex-3-enyl, and the like.

The term "aryl" refers to an aromatic hydrocarbon group derived from the removal of at least one hydrogen atom from a single carbon atom of a parent aromatic ring system. The radical attachment site can be at a saturated or unsaturated carbon atom of the parent ring system. The aryl group can have from 6 to 30 carbon atoms, for example, about 6-10 carbon atoms. In other embodiments, the aryl group can have 6 to 60 carbons atoms, 6 to 120 carbon atoms, or 6 to 240 carbon atoms. The aryl group can have a single ring (e.g., phenyl) or multiple condensed (fused) rings, wherein at least one ring is aromatic (e.g., naphthyl, dihydrophenanthrenyl, fluorenyl, or anthryl). Typical aryl groups include, but are not limited to, radicals derived from benzene, naphthalene, anthracene, biphenyl, and the like. The aryl can be unsubstituted or optionally substituted.

A "solvent" as described herein can include water or an organic solvent. Examples of organic solvents include hydrocarbons such as benzene, toluene, xylene, hexane, and heptane; chlorinated solvents such as methylene chloride, chloroform, and dichloroethane; ethers such as diethyl ether, dioxane, tetrahydrofuran, and dibutyl ether; ketones such as acetone and 2-butanone; esters such as ethyl acetate and butyl acetate; nitriles such as acetonitrile; alcohols such as methanol, ethanol, and tert-butanol; and aprotic polar solvents such as N,N-dimethylformamide (DMF), N,N-dimethylacetamide (DMA), and dimethyl sulfoxide (DMSO). Solvents may be used alone or two or more of them may be mixed for use to provide a "solvent system".

The phrase "one or more" is readily understood by one of skill in the art, particularly when read in context of its usage. For example, one or more substituents on a phenyl ring refers to one to five, or one to up to four, for example if the phenyl ring is disubstituted. One or more subunits (i.e., repeat units or blocks) of a polymer can refer to about 5 to about 100,000, or any number of subunits.

The term, "repeat unit", "repeating unit", or "block" as used herein refers to the moiety of a polymer that is repetitive. The repeat unit may comprise one or more repeat units, labeled as, for example, repeat unit A, repeat unit B, repeat unit C, etc. Repeat units A-C, for example, may be covalently bound together to form a combined repeat unit. Monomers or a combination of one or more different monomers can be combined to form a (combined) repeat unit of a polymer or copolymer.

The copolymers described herein can comprise random copolymers (as designated by "r", which can be added to a repeat unit of a formula to indicate the randomness) or block copolymers (as designated by "b", which can be added to a repeat unit of a formula to indicate a block portion of the formula). The random or block nature of a particular moiety would be readily recognized by one of skill in the art by virtue of the method of preparation and type of monomers used in a particular polymerization.

The term "molecular weight" for the copolymers disclosed herein refers to the average number molecular weight (Mn). The corresponding weight average molecular weight (Mw) can be determined from other disclosed parameters by methods (e.g., by calculation) known to the skilled artisan.

In various embodiments, the ends of the copolymer (i.e., the initiator end or terminal end), is a low molecular weight moiety (e.g. under 500 Da), such as, H, OH, OOH, $CH_2OH$, CN, NH$_2$, or a hydrocarbon such as an alkyl (for example, a butyl or 2-cyanoprop-2-yl moiety at the initiator and terminal end), alkene or alkyne, or a moiety as a result of an elimination reaction at the first and/or last repeat unit in the copolymer.

EMBODIMENTS OF THE INVENTION

This disclosure provides a method of preparing a bottlebrush copolymer comprising:
a) growing a macromonomer in a first mixture, wherein the macromonomer is covalently bonded to a ring-strained cyclic olefin, the macromonomer is formed via a controlled polymerization (CP), and the macromonomer has a molecular weight that grows with time;
b) feeding the first mixture into a second mixture via a semi-batch process, wherein the second mixture comprises a ROMP catalyst and a CP quenching agent, and the first and second mixture form a living copolymer via grafting-through ring opening olefin metathesis polymerization (ROMP); and
c) quenching the living copolymer thereby providing a bottlebrush copolymer having a bottlebrush architecture;
wherein the molecular weight of the macromonomer continues to grow until it is quenched by the CP quenching agent, and the living copolymer has a molecular weight that continues to grow when fed the macromonomer.

In various embodiments, the first mixture comprises a ring-strained cyclic-olefin monomer having a nucleophile, and an electrophilic monomer thereby forming the macromonomer. In some embodiments, the olefinic ring-strained cyclic monomer comprises norbornene. In additional embodiments, the rate of feeding the first mixture into the second mixture determines the architecture of the bottlebrush copolymer. In further embodiments, the ratio $k_{obs}$ for ROMP to $k_{obs}$ for CP is about or greater than 10. In some embodiments, the first mixture comprises a CP catalyst or a CP base. In other embodiments, the CP catalyst comprises a basic nitrogen.

In some other embodiments, the electrophilic monomer is a lactone, a siloxane, a styrene, a methacrylate, 2-alkoxy-1,3,2-dioxaphospholane 2-oxide, or an epoxide. In various other embodiments, a mixture comprising another macromonomer feeds into the second mixture simultaneously with the first mixture, or sequentially after the first mixture. In other embodiments, the bottlebrush architecture has an axisymmetric shape, or the bottlebrush architecture has a monotonic axisymmetric shape. In some embodiments, the bottlebrush architecture is cylindrical, conical, ellipsoidal, concave elliptical, or football shaped.

In further additional embodiments, the bottlebrush copolymer has a dispersity index of about 1.01 to about 1.25. In some other embodiments, the CP quenching agent is a boronic acid, an alkylhalosilane, or an alcohol. In various additional embodiments, the ROMP catalyst comprises a transition metal carbene complex. In other additional embodiments, the ROMP catalyst is a Grubbs ruthenium catalyst or a Schrock catalyst. In some various embodiments, the controlled polymerization is an anionic polymerization or a ring opening polymerization.

This disclosure also provides a method of preparing a bottlebrush copolymer comprising:
a) contacting a first mixture of monomers with a varying amount of an CP catalyst in a plug-flow reactor to form a macromonomer, wherein the macromonomer is covalently bonded to a ring-strained cyclic olefin, and the macromonomer is formed via a controlled polymerization (CP);
wherein the amount of CP catalyst that contacts the first mixture is increased or decreased at the time during contact;
b) allowing the macromonomer to grow wherein the molecular weight of the macromonomer is dependent on the amount of the CP catalyst contacting the first mixture at the time during contact while traversing the reactor, thereby forming macromonomers having different molecular weights at different points in time;
c) feeding macromonomers from the reactor into a second mixture via a semi-batch process wherein the second mixture comprises a ROMP catalyst and a CP quenching agent, and first and second mixture form a living copolymer via grafting-through ring opening olefin metathesis polymerization (ROMP); and
d) quenching the living copolymer thereby providing a bottlebrush copolymer having a bottlebrush architecture;
wherein the molecular weight of the macromonomer continues to grow until it is quenched by the CP quenching agent, and the living copolymer has a molecular weight that continues to grow when fed the macromonomer.

In various embodiments, the first mixture comprises a norbornene monomer having a nucleophile, and an electrophilic monomer; and wherein the CP catalyst is 1,8-diazabicyclo[5.4.0] undec-7-ene (DBU), and the ratio $k_{obs}$ for ROMP to $k_{obs}$ for CP is about or greater than 10 min$^{-1}$.

Additionally, this disclosure provides a macromolecule comprising Formula I:

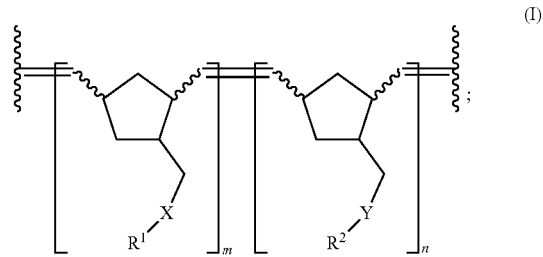

wherein
the macromolecule of Formula I has a bottlebrush configuration that is non-cylindrical;
each double bond independently has a cis- or trans-configuration;
R$^1$ and R$^2$ independently comprise Formula IA or Formula IB:

wherein
R$^3$ and R$^4$ are independently —(C$_1$-C$_6$)alkyl; and
p and q are independently 1-10,000;
wherein p and q are different for about every 8 or less monomer units (m+n) of Formula I;
X and Y are independently N, O or S, and form a direct bond to the initial carbonyl moiety of Formula IA or the initial silicon atom of Formula IB;
m is 10-100,000; and
n is 0-100,000;
wherein monomer unit m and monomer unit n are alternating when n is not 0; and
wherein the macromolecule has a dispersity index of about 1.01 to about 1.25.

In various embodiments, the axisymmetric shape is cylindrical, conical, ellipsoidal, concave elliptical, or football shaped. In some embodiments, the shape is monotonic. In other various embodiments, a polymer of Formula I is a random polymer, block copolymer, graft copolymer, statistical copolymer, or a gradient copolymer wherein the macromonomer composition changes gradually along the backbone of the macromolecule chain.

In some embodiments, X is O, R$^1$ is Formula IA, and n is 0. In other embodiments, X is O, R$^1$ is Formula IB, and n is 0.

This disclosure provides ranges, limits, and deviations to variables such as volume, mass, percentages, ratios, etc. It is understood by an ordinary person skilled in the art that a range, such as "number1" to "number2", implies a continuous range of numbers that includes the whole numbers and fractional numbers. For example, 1 to 10 means 1, 2, 3, 4, 5, . . . 9, 10. It also means 1.0, 1.1, 1.2. 1.3, . . . , 9.8, 9.9, 10.0, and also means 1.01, 1.02, 1.03, and so on. If the variable disclosed is a number less than "number10", it implies a continuous range that includes whole numbers and fractional numbers less than number10, as discussed above. Similarly, if the variable disclosed is a number greater than "number10", it implies a continuous range that includes whole numbers and fractional numbers greater than number10. These ranges can be modified by the term "about", whose meaning has been described above.

Results and Discussion

This disclosure envisions that the shape and size of bottlebrush polymers could be programmed by implementing a computer controlled semi-batch reactor set-up in conjunction with a graft-through polymerization (FIG. 1, top). With this approach, the flowrate profile of the solution of growing macromonomer would directly translate into the shape of the bottlebrush polymer. The reactor setup consists of a syringe/syringe pump as the first reaction vessel and a flask as the second vessel. In the first vessel, the macromonomers are synthesized via a controlled polymerization, while the solution is continuously fed into the second reaction vessel. The brush growth is immediately quenched upon addition to the second vessel, and the macromonomers are rapidly and quantitatively incorporated into the growing bottlebrush polymer via a graft-through polymerization. Over time, the length of the macromonomer increases in the first vessel, and the process results in a shaped bottlebrush polymer in the second vessel.

To implement the proposed shape-controlled synthesis, a few polymerization selection criteria are considered. First, the two polymerizations should be fully compatible and orthogonal. Second, the macromonomer synthesis should be quenched readily in the second vessel. Third, the graft-through polymerization should have a very high rate of polymerization to prevent the accumulation and scrambling of macromonomers of different lengths. Grubbs 3$^{rd}$ generation (G3) catalyzed ROMP of norbornene-type monomers was selected for the graft-through polymerization (the backbone-forming reaction), as it results in very narrow polymer molecular weight dispersities at very high monomer conversion. The ROP of lactide catalyzed by a 1,8-diazabicyclo [5.4.0]undec-7-ene (DBU) was selected for the brush synthesis as an orthogonal and quenchable polymerization.

The polymerization rates for both brush and backbone growth were determined independently. The rate constant of ROP of lactide (k$_p$=200 M$^{-2}$ min$^{-1}$, Example 3) was determined, and extremely narrow polymer dispersities were achieved (Đ<1.1). The narrow polymer dispersities are a key element for maintaining shape control, as a broad polymer distribution would reduce the shape resolution. The rates of polymerization of G3 initiated ROMP of macromonomers (nor-PLA) were measured over a broad range of molecular weights (Example 5). In all cases, the rates of polymerization were very fast (k$_{obs}$>1.5 min$^{-1}$) compared to ROP (~10$^2$×faster). This large difference in polymerization rates is important to ensure that the macromonomer growth and, thus, the feed rate of macromonomers are slow enough so that the fast ROMP is able to maintain a high macromonomer conversion; i.e. prevent the accumulation and scrambling of brushes of various lengths in the ROMP pot.

To ensure the orthogonality of ROMP and ROP a study was conducted to explore the compatibility of both polymerizations in detail. A model system using nor2 ((bicyclo [2.2.1]hept-5-en-2-yl)methyl benzoate) as a monomer for ROMP was implemented to probe the effect of ROP reagents on ROMP (Example 4). Only DBU was identified to be an inhibitor. Therefore, DBU must be quantitatively scavenged out of solution upon addition to the second vessel. Boric acid was found to be very efficient in this role as it fully quenched ROP, without affecting the ROMP (wrt. rate and polymer dispersity) prior and post DBU quenching. Finally, it was demonstrated that ROMP remained controlled under semi-batch conditions by slowly feeding a solution of 500 equiv. of nor2 to a solution of G3 over the course of 1 hour. Full monomer conversion was achieved, and the isolated polymer had the same molecular weight, as in the batch experiment (M$_n$=113 kg/mol, Đ=1.03).

A key feature of the methodology is that the molecular shape is a direct result of the flowrate profile ($\vartheta_o$ (flow rate) vs t(time)) of liquid from vessel 1 to vessel 2. Three specific geometric shapes (cone, ellipsoid and concave elliptical cone) were targeted to establish the methodology. However, the method can, in principle, be used to synthesize any axisymmetric monotonic geometry. The flowrate equations/profiles were derived using a constraint that describes the relationship between brushes' length with respect to backbone position (i.e. shape). A unique feature of this is that each shape and size has a different characteristic flowrate profile. The constraint for a cone, for example, is a constant, 'A' (eq. 1), which embodies the cone angle. The flowrate equation for the cone is presented in eq. 2. A detailed derivation of the flowrate equations for all the targeted geometries can be found in Example 9.

$$\text{constant} \equiv A = \frac{N_{brush}}{N_{bb}} \quad (1)$$

$$\vartheta_o = \left(\frac{N_{brush}^{syn,max}}{N_{bb}^{syn,max}}\right)\left(\frac{V_1}{A}\right)(K_{ROP})e^{-K_{ROP}t} \quad (2)$$

The flowrate equation is the only mathematical framework needed to synthesize shaped bottlebrush polymers. Additionally, it is possible to predict the polymerization outcomes (i.e., conversion of lactide and norbornene in both reaction vessels and Mn of brushes and bottlebrush polymers) at any time by combining the flow rate equation with the rate laws and the design equations for semi-batch reactors (Example 9). The use of a mathematical framework to predict the polymerization outcomes provides a first principle methodology for proving precise shape and size control. Each shape and size has its own flowrate equation and its own characteristic prediction profile. A match between the experimental data and the predictions would validate a successful synthesis of a shaped bottlebrush, as no other macromolecule could have been synthesized. To that end, a Matlab code was written to numerically solve the design equations (Example 10) and generate the predictions.

Figure 2:
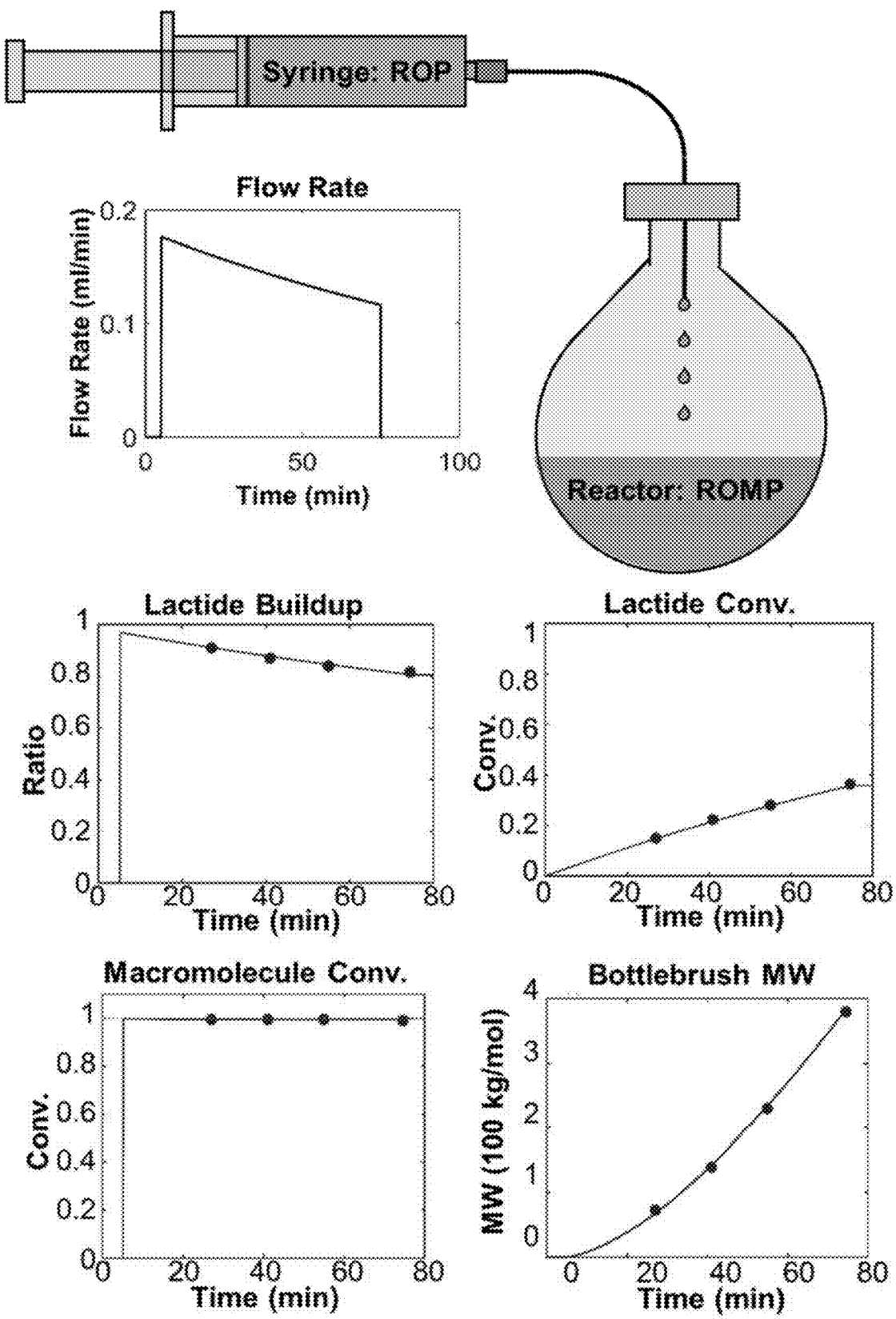
FIG. 2. Plot of predicted (line) and experimental (dots) polymerization outcomes for the synthesis of a conical shaped bottlebrush.

To compare an experiment directly with calculated predictions, the synthesis of a conical-shaped polymer ($N_{bush}^{max}$=50, $N_{bb}$=185) was performed multiple times, quenching the polymerizations at different reaction time points by simultaneously halting the flow of macromonomer and injecting vinyl ether to stop ROMP. The crude polymer mixtures were analyzed by GPC and NMR spectroscopy to determine the system outcomes (FIG. 2, Example 6). First, the conversion of lactide (blue line/dots) proceeded as predicted, and when combined with the flowrate profile (green line) it confirms that the macromonomers fed out of the syringe had the desired conical profile. Second, no residual macromonomer (Nor ROMP pot, blue line/dots) was detected in the graft through polymerization vessel at any time point (Example 11 for detection limit) providing proof of rapid incorporation of the macromonomers into the growing bottlebrush and thus ensuring that no scrambling of brushes of different lengths occurs. Third, the experimental and the predicted bottlebrush molecular weights (red line/dots) were in close agreement, and all bottlebrush polymers had narrow molecular weight distributions (Đ<1.1). Altogether the strong agreement between the prediction and the experiments validates the shape and size control of the process.

The precision and flexibility of the methodology was further illustrated by synthesizing a series of conical-shaped bottlebrush polymers with different sizes, backbone lengths and cone angles (Table 1, Example 6). In all cases, the predicted parameters (molecular weights and conversions) matched the experimental values well, no residual macromonomers are detected, and the polymers remained narrowly dispersed (Đ≤1.12). Next, the methodology was expanded to ellipsoid and concave elliptical cone shapes (Table 1). This was achieved by simply implementing the corresponding flowrate equations. Once again, NMR and GPC were used to analyze the products of the reactions. Narrow molecular weight distributions and strong agreement with predictions establish the exquisite control over shape and size. To further validate the methodology, AFM images of a conical shaped polymer were collected. The size and shape observed are consistent with theoretical calculations of size (Example 12).

The generality of the synthetic strategy was further showcased by expanding the chemical versatility of the process. The anionic ROP of cyclic siloxanes for the synthesis of PDMS brushes was used in place of the ROP of lactide. A detailed kinetic analysis and chemical compatibility study was performed, which identified trimethylsilyl chloride (TMSCl) as an effective quenching agent (Example 7). PDMS conical bottlebrushes were successfully synthesized with narrow molecular weight distributions (Đ≤1.2) and no detectable unreacted macromonomers were observed (Table 1, Example 7).

Figure 3:
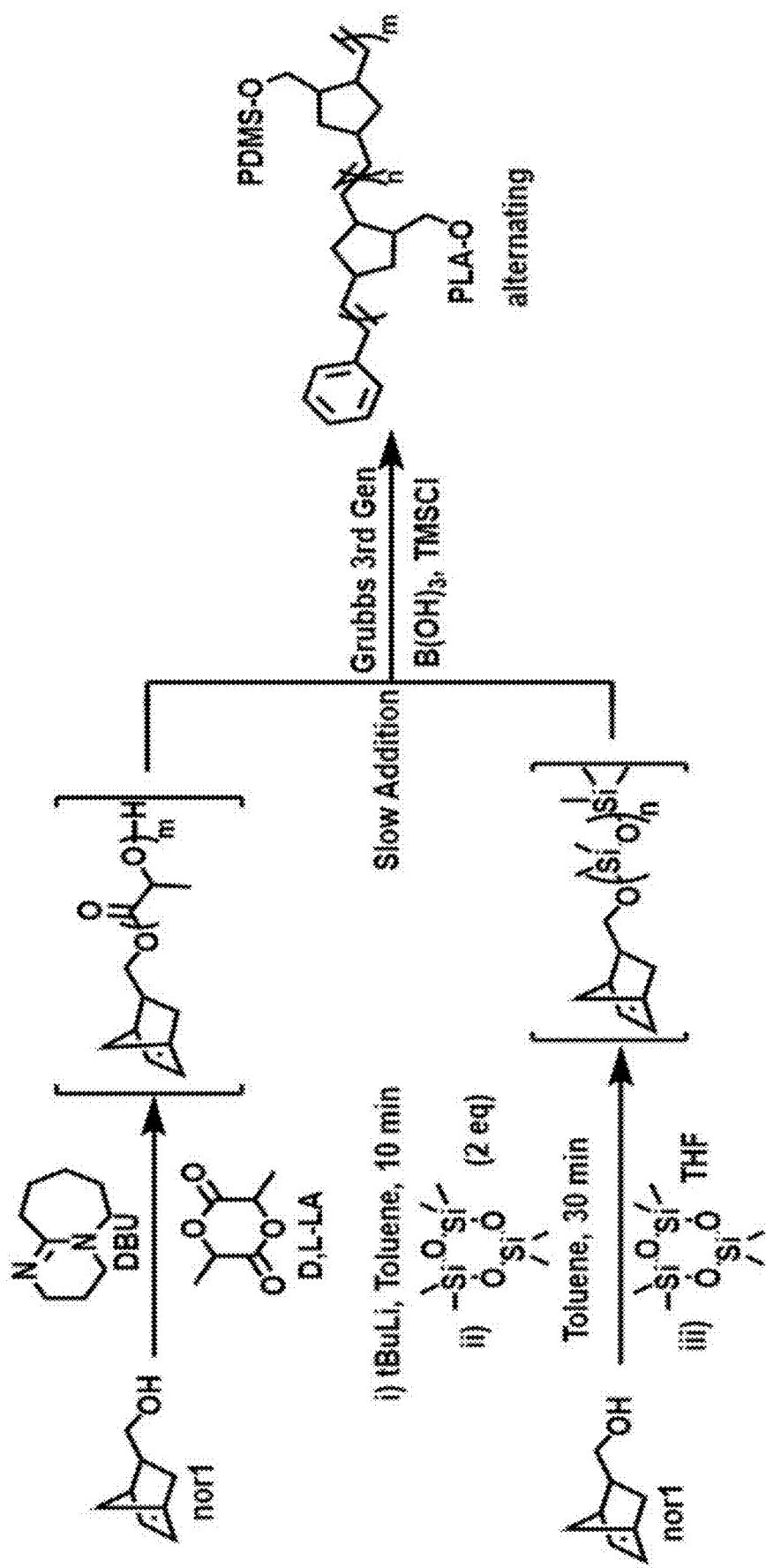
FIG. 3. Synthesis of a compositional asymmetrical cone composed of PLA and PDMS arms.

Finally, as a second example illustrating the chemical versatility of the process, a compositional asymmetric cone was synthesized. This was achieved by co-feeding two macromonomer synthesis reaction mixtures, one for PLA and one for PDMS, into a single vessel of G3, boric acid and TMSCl (FIG. 3, Example 8). Analysis of the crude reaction mixture confirmed that the experimental conversions matched the predicted values, while maintaining a narrow polymer dispersity (Đ=1.19). The precision of the synthesis of this complex molecular object exemplifies the chemical flexibility and shape control of the methodology. Moreover, this one-step synthesis was completed in less than 2 hours, using exclusively commercially available reagents.

In conclusion, this work establishes a scalable strategy to synthesize macromolecules with programmable shape, size and composition. Reactor engineering principles and controlled polymerizations are leveraged to achieve the continuous control of brush length along the polymer backbone. This allowed for the programming of shape and size by simply changing the flowrate within the system. Macromolecules with conical, ellipsoidal and concave architectures were synthesized and a mathematical model was used to confirm that precise synthetic control was achieved. The chemical versatility of the method was illustrated by the synthesis of a compositional asymmetric cone containing both asymmetric shape and compositional contrast within a single macromolecule. Overall, this methodology provides an unprecedented ability to independently probe the impact of macromolecules shape, size and chemistry for the development of new materials.

In conclusion, this work establishes a scalable strategy to synthesize macromolecules with programmable shape, size and composition. Reactor engineering principles and controlled polymerizations are leveraged to achieve the continuous control of brush length along the polymer backbone. This allowed for the programming of shape and size by simply changing the flowrate within the system. Macromolecules with conical, ellipsoidal and concave architectures were synthesized and a mathematical model was used to confirm that precise synthetic control was achieved. The chemical versatility of the method was illustrated by the synthesis of a compositional asymmetric cone containing both asymmetric shape and compositional contrast within a single macromolecule. Overall, this methodology provides an unprecedented ability to independently probe the impact of macromolecules shape, size and chemistry for the development of new materials.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

TABLE 1

Predicted and experimental data for the synthesis of shape-controlled bottlebrush polymers.[a]

| entry | Shape | Composition | Prediction | | | | Experimental Data | | | | Nor Conv (NMR)[c] |
|---|---|---|---|---|---|---|---|---|---|---|---|
| | | | $N_{bb}$ | $M_{n,brush,max}$ | Lac Buildup | $M_{n,BB}$ | $M_{n,brush,max}$[b] | Lac Buildup[c] | $M_{n,BB}$[d] | Đ[d] | |
| 1 | Conical | PLA | 100 | 3.63 | 81.7% | 200 | 3.59 | 81.3% | 178 | 1.07 | >98% |
| 2 | | PLA | 200 | 3.63 | 81.7% | 400 | 3.55 | 80.7% | 515 | 1.12 | >98% |
| 3 | | PLA | 500 | 3.63 | 81.7% | 998 | 3.59 | 81.7% | 895 | 1.09 | >98% |
| 4 | Ellipsoid | PLA | 200 | 2.48 | 81.7% | 400 | 2.44 | 81.5% | 522 | 1.13 | >98% |
| 5 | Concave Elliptical Cone | PLA | 200 | 6.27 | 81.7% | 400 | 6.34 | 81.2% | 521 | 1.14 | >98% |
| 6 | Conical | PDMS | 200 | 6.73 | — | 767 | 6.72 | — | 153b | 1.18b | >98% |

[a]$M_n$ are in kg/mol and reaction conditions can be found in the Examples.
[b]Data collected from GPC in THF with respect to PLA standards for PLA and PS standards for PDMS.
[c]Calculated from $^1$H NMR.
[d]Data collected from triple detect GPC.

EXAMPLES

Example 1. General Methods, Materials, Abbreviations and Definitions

All reactions were performed in oven dried glassware under an argon atmosphere using standard Schlenk line techniques or in an argon-filled glovebox ($O_2$<2 ppm, $H_2O$<0.5 ppm) at room temperature unless otherwise specified. All solvents were dried using a solvent purification system. All commercially obtained reagents were used as received: 3-Bromopyridine {Aldrich, 99%}, Ethyl Vinyl Ether {Aldrich, 99%}, 1,8-diazabicyclo[5.4.0]-undec-7-ene (DBU) {Aldrich, 98%}, Boric Acid {Aldrich, 99.5%}, hexamethyl-cyclotrisiloxane {Aldrich, 98%}, and tert-Butyl-lithium solution {1.7 M in pentane, Aldrich}. D,L-lactide was purchased from Aldrich and recrystallized 6 times from dry toluene and dried under reduced pressure (0.01 mm Hg) with $P_2O_5$ for 2 days prior to use. Chloro-trimethylsilane (TMSCl) was distilled over $CaH_2$ and storage under argon. [($H_2$IMes)(3-Br-py)$_2$($Cl$)$_2$Ru=CHPh], G3 was synthesized according to literature and can be purchased from Aldrich. nor1, nor2 were synthesized according to literature and nor1 can be purchased from Aldrich.

Nuclear Magnetic Resonance (NMR) spectra were recorded on a Bruker AVANCE III 500 MHz. Spectra are reported in ppm and referenced to the residual solvent signal: $CDCl_3$ ($^1$H 7.26 ppm, $^{13}$C 77.16 ppm), $C_6H_6$ ($^1$H 7.16 ppm, $^{13}$C 128 ppm), $CD_2Cl_2$ ($^1$H 5.32 ppm). Gel Permeation Chromatography (GPC) was performed using a Tosoh Ecosec HLC-8320GPC at 40° C. fitted with a reference column (6.0 mm ID×15 cm), a guard column (6.0 mm ID×4.0 cm×5 µm), and two analytical columns (7.8 mm ID×30 cm×5 µm). The reference flow rate is 0.5 mL min$^{-1}$ while the analytical column is at 1.0 mL·min$^{-1}$. THF (HPLC grade) was used as the eluent, and polystyrene standards (15 points ranging from 500 Mw to 8.42 million Mw) were used as the general calibration. An additional calibration was created for specifically for linear polylactic acid and only used for linear polylactic acid (10 points ranging from 500 Mw to 10,000 Mw).

Triple Detection Gel Permeation Chromatography was performed using a Viscotek GPCmax pump and TDA302 triple detector (Refractive Index, 90° and 7° light scattering, Viscometer) at 35° C. fitted with two mixed-bed analytical columns (PolyAnalytik PAS-M: 8 mmID×30 cm length, 10 µm particles, exclusion limit 20,000,000 Da relative to polystyrene). The flowrate was 1.0 mL·min$^{-1}$. THF (HPLC grade) was used as the eluent. The detectors were calibrated with a narrow polystyrene standard (Mw=99,000 Da). Polymer solutions were prepared at a known concentration (ca. 5 mg/mL) and an injection volume of 30 µL was used. do/dc values for the bottlebrush polymers were obtained for each injection by assuming 100% mass elution from the columns. Atomic force microscopy (AFM) imaging was performed using a MFP-3D system (Asylum Research, Santa Barbara, Calif.) in tapping mode using standard silicon tips (Tap150A1-G tips, F: 150 kHz, C:5 N/m, L:125 µm, Budget Sensors).

Abbreviations/Definitions

GPC: Refractive index Gel permeation chromatography with respect to polystyrene standards
tGPC: Triple Detection Gel Permeation Chromatography
NMR: Nuclear Magnetic Resonance
AFM: Atomic force microscopy
cBB: cylindrical bottlebrush
tBB: cone ('triangular') bottlebrush
eBB: elliptical bottlebrush
vBB: concave elliptical cone bottlebrush
dBB: di-compositional bottlebrush
nor1: 5-Norbornene-2-methanol, or (bicyclo[2.2.1]hept-5-en-2-yl)methanol
nor2: (bicyclo[2.2.1]hept-5-en-2-yl)methyl benzoate
G3: 3$^{rd}$ generation Grubbs catalyst
TMSCl: Trimethylsilyl chloride
DBU: 1,8-Diazabicyclo[5.4.0]undec-7-ene
$ϑ_o$: Flow rate from syringe to vessel 2
N: Degree of polymerization
$N_{brush}$: Degree of polymerization of the brush at time 't'
$N_{brush}^{max}$: Degree of polymerization of the brush, the maximum length for a given bottlebrush shape
$N_{bb}$: Degree of polymerization of the backbone
$N_{brush}^{syn,max}$: Degree of polymerization of the brush, the maximum length possible for a given synthesis at 100% cony. [Ex. $N_{brush}^{syn,max}$=(moles of lactide)/(moles of nor1)]
$N_{bb}^{syn,max}$: Degree of polymerization of the backbone, the maximum length possible for a given synthesis at 100% cony. [Ex. $N_{bb}^{syn,max}$=(moles of nor1)/(moles of G3)]
Lactide Buildup: The lactide that has been unconverted in the ROMP pot (second vessel).

$$Lac_{buildup} = \frac{\text{Unreacted } Lac \text{ in } ROMP \text{ pot}}{Lac \text{ in (polymer and unreacted) the } ROMP \text{ pot}}$$

Calculated from $^1$H NMR of aliquots from the ROMP pot $$Lac_{buildup} = \frac{\text{Integration of lacitide}}{\text{Integration of lacitide} + \text{Integration of } PLA}$$

Nor Conv.: The conversion of norbornene in the ROMP pot with respect to all the norbornene in the entire system initially.

Calculated from $^1$H NMR of aliquots from the ROMP pot $$Nor \text{ Conv. } (NMR) = 1 - \frac{\text{mmol } Nor \text{ ROMP}}{\text{mmol } Nor \text{ system intially}}$$

Also calculated from GPC of aliquots from the ROMP pot $$Nor \text{ Conv. } (GPC) = 1 - \frac{\text{Area of macromonomer}}{\text{Area of (macromonomer} + \text{bottlebrush)}}$$

(More definitions from mathematical derivations are defined below in Examples 9 and 10)

Example 2. GPC of Bottlebrush Polymer with RI Detector

It is well established that the use of linear polymers as a GPC calibration material for the determination of molecular weights of bottlebrush polymers does not provide accurate values. Therefore, triple detection GPC has become the traditional technique used to determine molecular weight of bottlebrush polymers. However, most of the development of the methodology herein was accomplished using a GPC equipped with a RI detector calibrated with polystyrene standards. While the molecular weights of bottlebrush polymers determined by this method are not as accurate, the dispersities calculated are still informative of the true dispersity of the sample. Thus, they are reported for all the materials as support for a well-defined material. The first evidence supporting this claim is the demonstration of GPC's ability to separate bottlebrush polymers of different molecular weights. The GPC can separate cylindrical bottlebrushes over a wide range of molecular weights (23 k g/mol to 4.6M g/mol) that were produced. This claim is further illustrated with the data shown in Table 6, entries 1 and 4, where the GPC determined dispersity are comparable to the dispersities measured by the triple detection GPC.

To further expand on the validity of using the dispersity from the GPC, the plot of the log of molecular weight versus time of the polystyrene standards was compared to the cylindrical bottlebrush samples. First was noted that both have a linear dependence, and second that the linear fits have nearly identical slopes with a constant offset. Since both polystyrene and bottlebrush polymers have identical slopes that means molecular weights differ only by a constant, and since dispersity is a ratio of molecular weights, the constant cancels out having no effect on polymer dispersity. This overall demonstrates that the polystyrene dispersities should correlate directly to with bottlebrush dispersities.

This calibration technique was then implemented to determine the molecular weights and dispersity of conical polymers (see Table). The good agreement between the molecular weights determined based on the conversion of the monomers and the ones determined using this calibration validated this approach.

Beyond the determination of molecular weights, the 'area under the curve' in the GPC chromatograms were used to determine the rates of polymerizations. This technique was used for the synthesis of PDMS bottlebrush polymers. To be successful, this technique requires precise preparation of the GPC samples as they all need to contain identical concentration of the polymerization mixtures. The validity of this method was first established by confirming that the sum of the areas of the macromonomer and bottlebrush signals were constant throughout the polymerization. The quantitative aspect of the refractive index intensity also provides an easy way to determine residual macromonomer in a bottlebrush polymer. At very high macromonomer conversion this method is more sensitive than $^1$H NMR.

Example 3. Kinetics of Ring Opening Polymerization (ROP) of Lactide

Procedure for ROP of Lactide with DBU

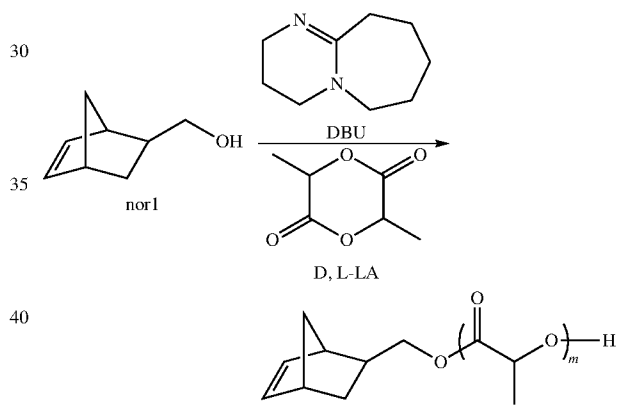

To an oven-dried 20 mL glass vial, lactide (1.23 g, 8.56 mmol) and nor1 (15.2 mg, 0.122 mmol) dissolved in 8.3 mL of THF. The polymerization was initiated by adding DBU (6.2 mg, 0.041 mmol) dissolved in 1 mL of THF. At various time point (10, 20, 30, 40 50, 60, 70, 80, 90 min), two 70 µL aliquots were removed from the reaction mixture and were injected into vials containing a large excess of acetic acid to be analyzed by $^1$H NMR spectroscopy and GPC.

$$[-OH] = \frac{0.122 \text{ mmol}}{9.3 \text{ ml } THF + 0.7 \text{ ml lactide}} = 0.0122 \, M$$

$$[DBU] = \frac{0.041 \text{ mmol}}{9.3 \text{ ml } THF + 0.7 \text{ ml lactide}} = 0.0041 \, M$$

$$r_p = k_{p(ROP)}[LA][-OH][DBU]$$

$$\ln\left(\frac{[LA]}{[LA]_o}\right) = -k_p[-OH][DBU]t$$

$$k_{obs} = 0.0099 \text{ min}^{-1}$$

$$k_p = 200 \, 1/(M^2 \text{ min})$$

Procedure for B(OH)₃ Quenching Experiments on ROP of Lactide with DBU

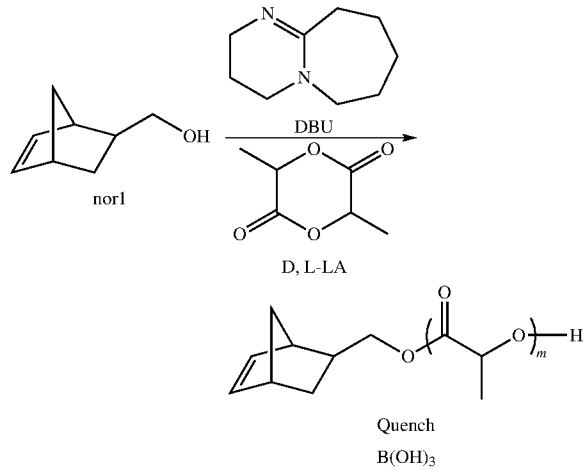

Quench
B(OH)₃

Figure 4:
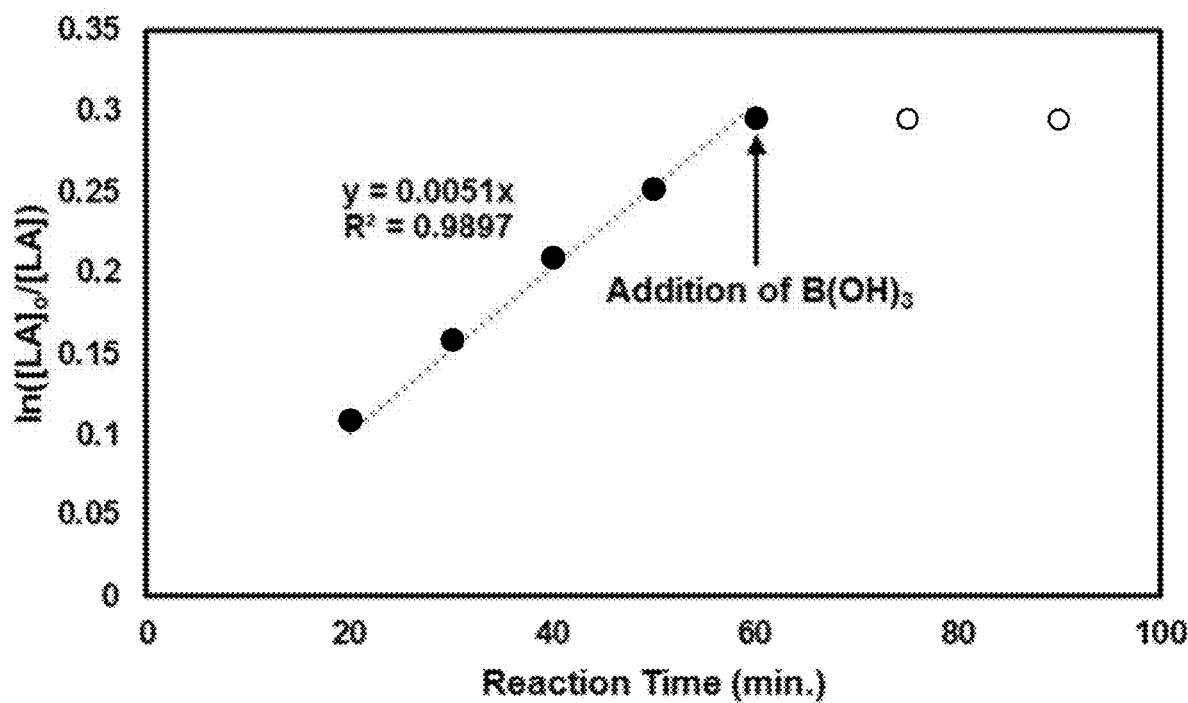
FIG. 4. Quenching kinetic data for ROP of lactide with DBU with $B(OH)_3$.

To an oven-dried 20 mL glass vial, lactide (1.23 g, 8.56 mmol) and nor1 (15.2 mg, 0.122 mmol) dissolved in 8.3 mL of THF. The polymerization was initiated by adding DBU (3.1 mg, 0.020 mmol) dissolved in 1 mL of THF. At various time point (20, 30, 40 50, 60 min), 70 µL aliquots were removed from the reaction mixture and were injected into vials containing a large excess of acetic acid to be analyzed by GPC. At 60 min B(OH)₃ (25.2 mg, 0.41 mmol) dissolved in THF (3 ml) was added to the reaction and two more 70 µL aliquots were removed (at 75 and 90 min) from the reaction mixture and analyzed by GPC (FIG. 4).

Note: In order to get B(OH)₃ to dissolve into THF, the solution was heated to ~80-90° C. till all the B(OH)₃ dissolved and allowed to cool back to room temperature before use. Avoid rapid cooling of the solution, as it causes B(OH)₃ to drop out of solution.

Example 4. Kinetics of Ring Opening Metathesis Polymerization (ROMP)

A Representative Procedure for ROMP of Nor2 (Table, Entry 1)

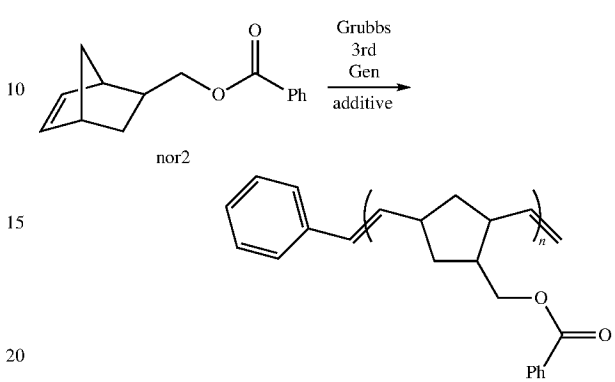

Figure 5:
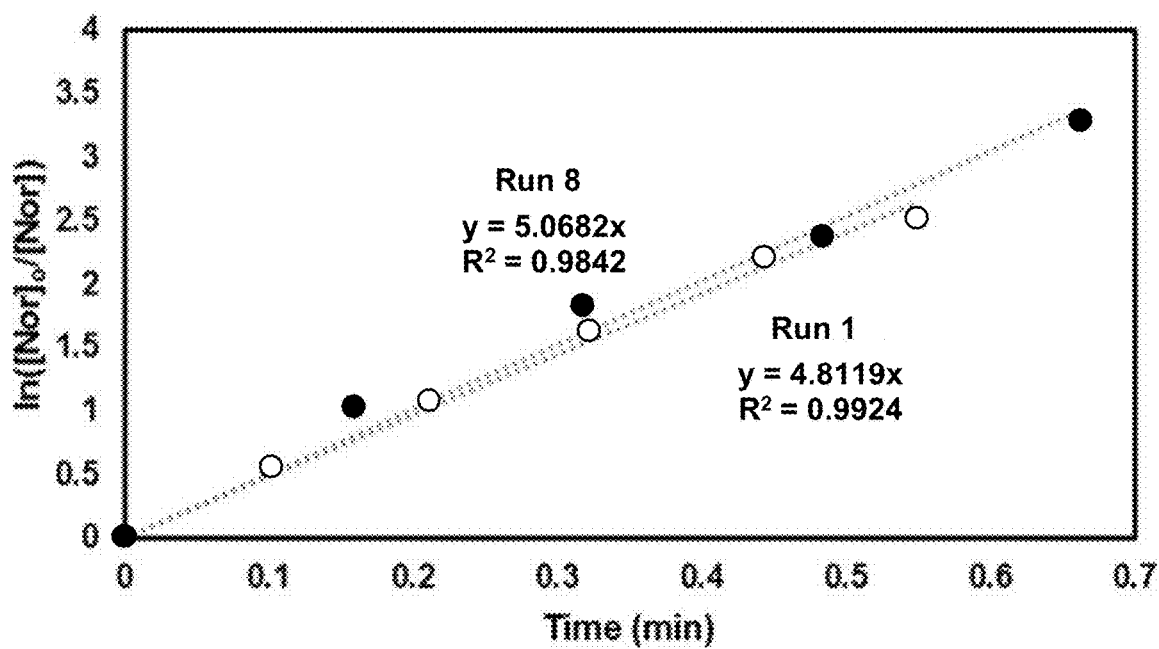
FIG. 5. Plot of $\ln([M]_o/[M])$ versus time for ROMP of nor2 for run 1 and run 8 (Table).

In an argon filled glovebox, nor2 (40 mg, 0.175 mmol) was dissolved into 2 ml of anhydrous THF. A separate stock solution of G3 was generated such that 2 ml of solution provide the amount of G3 needed for a specific degree of polymerization (N) (ex. N=200, 0.775 mg G3/2 ml of THF). The G3 solution 2 ml) was added to an empty vial and was diluted with 14.6 ml of THF. The mixture was stirred vigorously as nor2 stock solution (2 ml) was added quickly to initiate the polymerization. At various time points 50 µL aliquots were taken and were injected into vials containing a large excess of ethyl vinyl ether to be analyzed by ¹H NMR spectroscopy. A GoPro camera was setup to record the reaction and aliquot obtaining processes. The video was footage was reviewed after the reaction to get accurate time points. One minute after G3 addition to nor2, a large excess of ethyl vinyl ether was added to the reaction mixture. The reaction mixture was then poured into hexane and a centrifuge was used to isolate the resulting polymer. The polymer was dried under vacuum and then analyzed by GPC (FIG. 5).

TABLE 2

Summarized data for ROMP of nor2[g]

| Run | N | Additive | Eq. of additive to G3 | Nor. Conv. (NMR)[f] | $M_{n,theory}$[d] | $M_n$[e] | Đ[e] | $k_{obs}$ (1/min.) |
|---|---|---|---|---|---|---|---|---|
| 1[a] | 200 | none | — | >98% | 45,600 | 44,600 | 1.03 | 4.8 |
| 2[a] | 500 | none | — | >98% | 114,000 | 113,000 | 1.03 | — |
| 3[a] | 1000 | none | — | >98% | 228,000 | 216,000 | 1.06 | — |
| 4[b] | 500 | Lactide | 10,000 | — | 114,000 | 120,000 | 1.08 | — |
| 5[b] | 500 | Octanol | 100 | — | 114,000 | 119,000 | 1.06 | — |
| 6[b,c] | 500 | DBU | 30 | 31% | 36,000 | 35,900 | 1.03 | 0.023 |
| 7[b] | 500 | B(OH)₃ | 30 + 600 | — | 114,000 | 109,000 | 1.05 | — |
| 8[a] | 200 | DBU + B(OH)₃ | 30 + 600 | >98% | 45,600 | 45,000 | 1.02 | 5.1 |

[a][G3] = 0.047 mM, [Nor] = 9.4 mM, THF, 25° C..
[b][G3] = 0.175 mM, [Nor] = 87.5 mM, THF, 25° C..
[c]Reaction stopped at 16 min.
[d]$M_n$,theory = (Nor. Conv.) * N * 228 g/mol.
[e]GPC done in THF with respect to polystyrene standards.
[f]Calculated from ¹HNMR.

$$r_p = \frac{k_{app(ROMP)}[Ru][Nor]}{[Py]}$$

wherein [Ru] = [Py].

$$\ln\left(\frac{[Nor]}{[Nor]_o}\right) = -k_{app(ROMP)}t$$

$k_{app(ROMP)} = 4.8 \text{ min}^{-1}$

Procedure for ROMP Slow Addition of Nor2

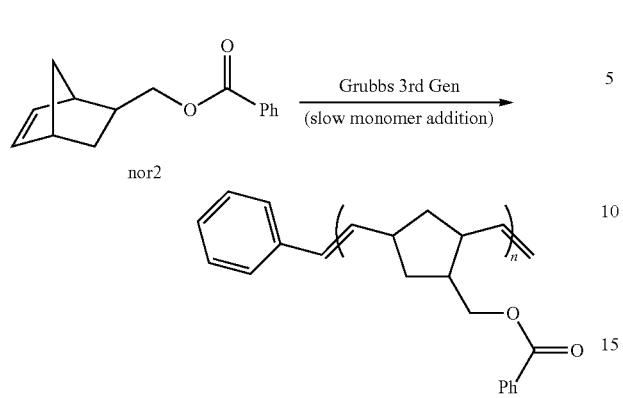

In a glovebox, G3(0.059 mg, 0.067 µmol) in 1 ml of THF was added to oven-dried 20 mL round bottom flask. The flask was capped with a silicon stopper and a syringe containing nor2 (7.6 mg, 33 µmol) in 2.5 mL of THF was fitted with a long needle was pushed through the stopper. This setup (syringe and round bottom flask) was set in a syringe pump. The entire nor2 solution was injected at a constant rate over 1 h. Upon completion of the addition, a large excess of ethyl vinyl ether (large excess with respect to [Ru]) was added to the reaction mixture. An aliquot (0.1 ml) was taken for $^1$H NMR for monomer conversion. The rest of the reaction mixture was then poured into hexane and a centrifuge was used to isolate the resulting polymer. The polymer was dried under vacuum and then analyzed by GPC. Nor. Conv. (NMR)=>98%, $M_{n,theory}$=114,000 g/mol, $M_{n,GPC}$=112,000 g/mol, Đ=1.11.

Example 5. Synthesis of Cylindrical PLA Bottlebrush Polymers (Table 3)

Procedure for the Synthesis of Cylindrical Bottlebrush Polymers (cBB)

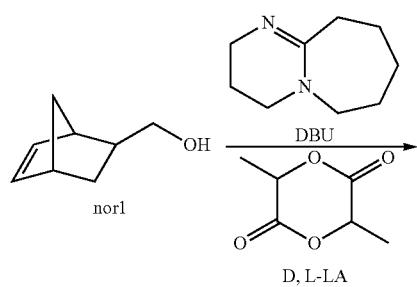

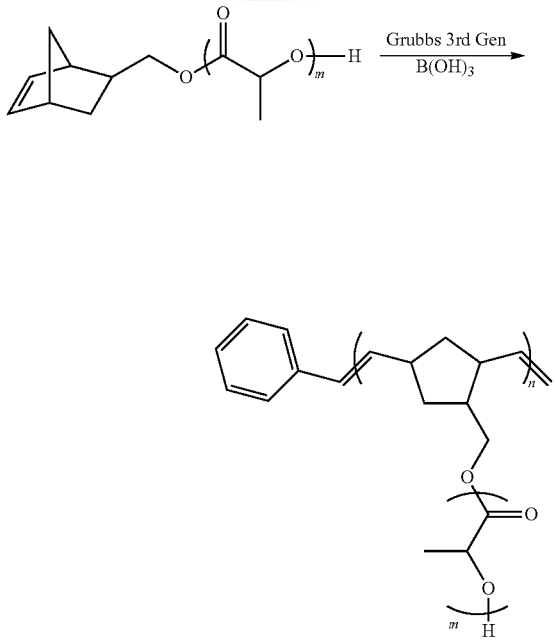

Figure 6:
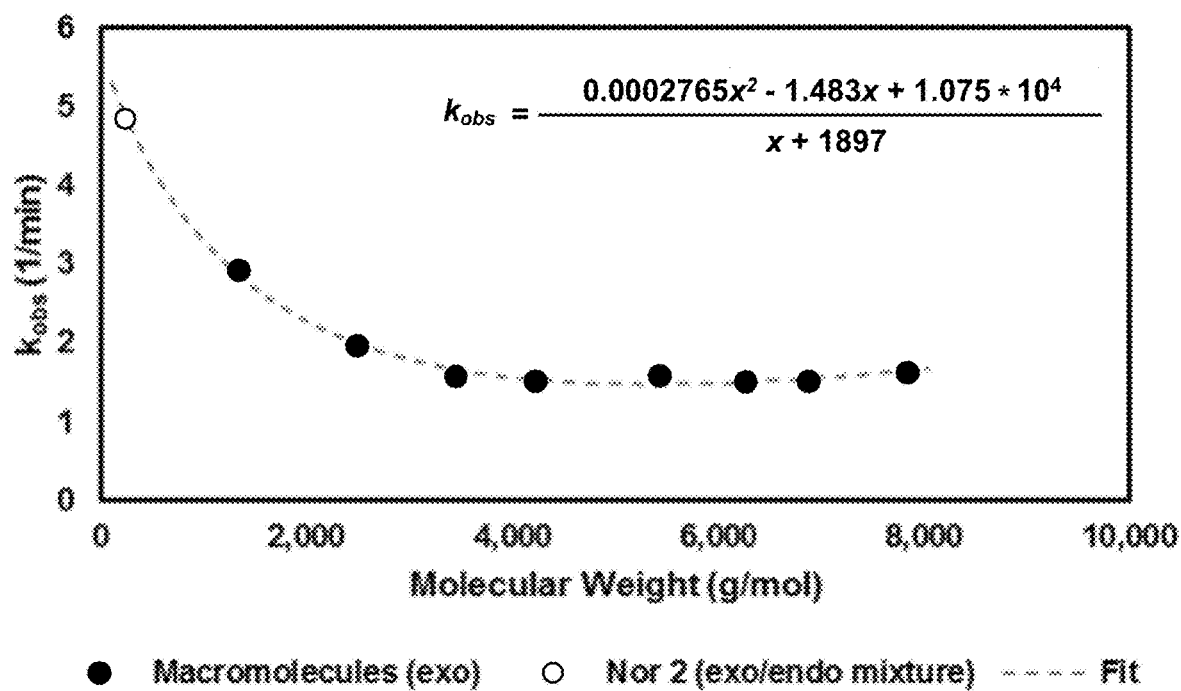
FIG. 6. Plot of the dependence of ROMP rate vs. molecular weight.

To an oven-dried 20 mL glass vial, lactide (1.23 g, 8.56 mmol, 0.74 ml) and nor1 (15.2 mg, 0.122 mmol) dissolved in 8.3 mL of THF. The polymerization was initiated by adding DBU (3.1 mg, 0.020 mmol) dissolved in 1 mL of THF. This reaction mix till the desired arm length was reached at which time B(OH)$_3$ (25.2 mg, 0.408 mmol) in 2.5 ml of THF was added to the reaction mixture. An aliquot was removed for GPC analysis. ROMP was initiated by adding G3 (0.54 mg, 0.61 µmol for $N_{bb}$=200) in 0.5 mL of THF. When kinetic data was taken 70 µL aliquots were removed from the reaction mixture and were injected into vials containing a large excess of ethyl vinyl ether to be analyzed by $^1$H NMR spectroscopy. Upon completion the reaction, a large excess of ethyl vinyl ether (large excess with respect to [Ru]) was added to the reaction mixture. An aliquot (0.1 ml) was taken for $^1$H NMR for monomer conversion. The rest of the reaction mixture was then poured into methanol and a centrifuge was used to isolate the resulting polymer. The polymer was dried under vacuum and then analyzed by GPC (FIG. 6).

Note: In order to get B(OH)$_3$ to dissolve into THF, the solution was heated to ~80-90° C. till all the B(OH)$_3$ dissolved and allowed to cool back to room temperature before use. Avoid rapid cooling of the solution, as it causes B(OH)$_3$ to drop out of solution

TABLE 3

Summarized data for ROMP of macromonomers[a]

| Run | $M_{n,arm}$[b] | Đ$_{arm}$[b] | $N_{bb}$ | $M_{n,cBB}$ (theory)[c] | $M_{n,cBB}$[d] | Đ$_{cBB}$[d] | Nor Conv (NMR)[e] | $k_{obs}$ (1/min) | $M_{n,cBB}$ (tGPC)[f] | Đ$_{cBB}$[f] |
|---|---|---|---|---|---|---|---|---|---|---|
| 1 | 2,200 | 1.08 | 200 | 440,000 | 172,000 | 1.05 | >98% | — | 452,000 | 1.06 |
| 2 | 3,600 | 1.06 | 200 | — | 223,000 | 1.04 | >98% | — | — | — |
| 3 | 5,800 | 1.04 | 200 | — | 292,000 | 1.05 | >98% | — | — | — |
| 4 | 2,000 | 1.09 | 500 | 1,000,000 | 433,000 | 1.04 | >98% | — | 1,100,000 | 1.08 |
| 5 | 1,300 | 1.14 | 200 | — | — | — | >98% | 2.92 | — | — |
| 6 | 2,500 | 1.10 | 200 | — | — | — | >98% | 1.96 | — | — |
| 7 | 3,500 | 1.08 | 200 | — | — | — | >98% | 1.60 | — | — |

TABLE 3-continued

Summarized data for ROMP of macromonomers[a]

| Run | $M_{n,arm}$[b] | $Đ_{arm}$[b] | $N_{bb}$ | $M_{n,cBB}$ (theory)[c] | $M_{n,cBB}$[d] | $Đ_{cBB}$[d] | Nor Conv (NMR)[e] | $k_{obs}$ (1/min) | $M_{n,cBB}$ (tGPC)[f] | $Đ_{cBB}$[f] |
|---|---|---|---|---|---|---|---|---|---|---|
| 8 | 4,200 | 1.07 | 200 | — | — | — | >98% | 1.54 | — | — |
| 9 | 5,400 | 1.06 | 200 | — | — | — | >98% | 1.60 | — | — |
| 10 | 6,300 | 1.06 | 200 | — | — | — | >98% | 1.51 | — | — |
| 11 | 6,900 | 1.07 | 200 | — | — | — | >98% | 1.53 | — | — |
| 12 | 7,900 | 1.07 | 200 | — | — | — | >98% | 1.63 | — | — |

[a]Mn are in g/mol.
[b]GPC done in THF with respect to polylactic acid standards.
[c]$M_{n,cBB} = M_{n,arm} \times N_{bb}$.
[d]GPC done in THF with respect to polystyrene standards.
[e]Calculated from $^1$H NMR.
[f]Triple detection GPC.

Procedure for the Synthesis of cBB in Semi-Batch (Table 4)

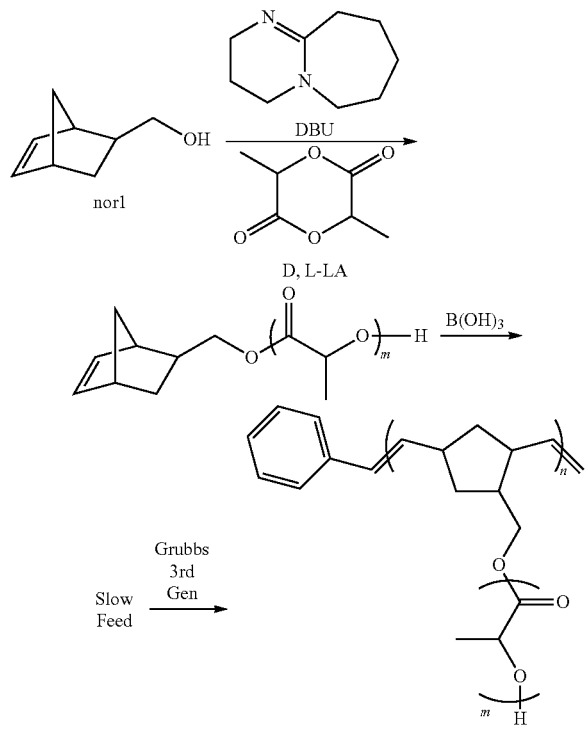

To an oven-dried 20 mL glass vial, lactide (1.23 g, 8.56 mmol, 0.74 ml) and nor1 (15.2 mg, 0.122 mmol) dissolved in 8.3 mL of THF. The polymerization was initiated by adding DBU (3.1 mg, 0.020 mmol) dissolved in 1 mL of THF. At 60 min B(OH)$_3$ (25.2 mg, 0.41 mmol) dissolved in THF (3 ml) was added to the reaction and a two 70 μL aliquots was removed from the reaction mixture and analyzed by GPC and NMR. This reaction mixture was then sucked up into a syringe and the needle was pushed through a septum of a round bottom flask containing G3 (0.54 mg, 0.61 μmol) in 1 mL of THF. This setup (syringe and round bottom flask) was set in a syringe pump. The entire nor1 solution was injected at a constant rate over 1 h. Upon completion of the addition, a large excess of ethyl vinyl ether (large excess with respect to [Ru]) was added to the reaction mixture. An aliquot (0.1 ml) was taken for $^1$H NMR and GPC for monomer conversion. The rest of the reaction mixture was then poured into methanol and a centrifuge was used to isolate the resulting polymer. The polymer was dried under vacuum and then analyzed by GPC.

Note: In order to get B(OH)$_3$ to dissolve into THF, the solution was heated to ~80-90° C. till all the B(OH)$_3$ dissolved and allowed to cool back to room temperature before use. Avoid rapid cooling of the solution, as it causes B(OH)$_3$ to drop out of solution.

TABLE 4

Summarized data for the synthesis of conical bottlebrushes[a]

| $N_{bb}$ | $M_{n,arm}$[b] | $Đ_{arm}$[b] | $M_{n,cBB}$ (theory)[c] | $M_{n,cBB}$[d] | $Đ_{cBB}$[d] | Nor Conv. (NMR)[e] | Nor Conv. (GPC)[d] | $M_{n,cBB}$ (tGPC)[f] | $Đ_{cBB}$ (tGPC)[f] |
|---|---|---|---|---|---|---|---|---|---|
| 200 | 4,700 | 1.05 | 940,000 | 246,000 | 1.07 | >98% | >98% | 965,000 | 1.09 |

[a]Mn are in g/mol.
[b]GPC done in THF with respect to polylactic acid standards.
[c]$M_{n,cBB} = M_{n,arm} \times N_{bb}$.
[d]GPC done in THF with respect to polystyrene standards.
[e]Calculated from $^1$H NMR.
[f]Triple detection GPC

Example 6. Synthesis of Shape-Controlled PLA Bottlebrush Polymers (Table 5)

Procedure for the Kinetics Study of the Synthesis of Conical PLA Bottlebrush Polymers

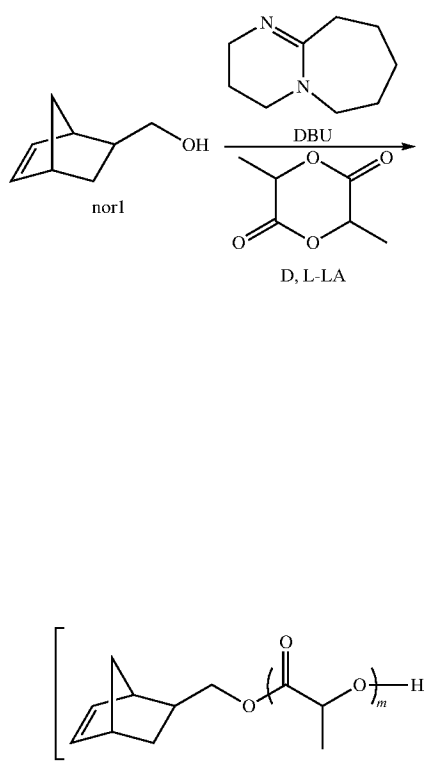

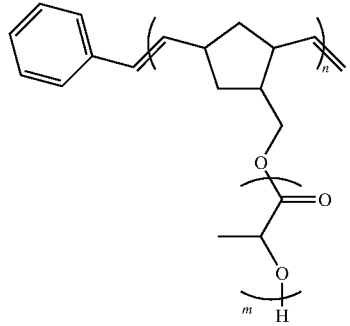

The following procedure was repeated 4 times stopping at different time points (27, 41, 55, 73 min) each time.

To an oven-dried 25 mL glass vial, lactide (2.46 g, 17.12 mmol, 1.4 ml) and nor1 (30.4 mg, 0.244 mmol) dissolved in 16.6 mL of THF. The polymerization was initiated by adding DBU (7.46 mg, 0.0490 mmol) dissolved in 1 mL of THF. This reaction mixture was immediately sucked up into a syringe and the needle was pushed through a septum of a round bottom flask containing $B(OH)_3$ (60.6 mg, 0.980 mmol) and G3 (1.2 mg, 1.3 μmol for $N_{bb}$=185) in 3 mL of THF. This setup (syringe and round bottom flask) was set in a syringe pump. The reaction mixture was added according to the equation below. At the specified time point, the syringe pump was stopped and a large excess of ethyl vinyl ether (large excess with respect to [Ru]) was immediately added to the reaction mixture. An aliquot (0.1 ml) was taken for $^1$H NMR and GPC for monomer conversion. The rest of the reaction mixture was then poured into methanol and a centrifuge was used to isolate the resulting polymer. The polymer was dried under vacuum and then analyzed by GPC.

Note: In order to get $B(OH)_3$ to dissolve into THF, the solution was heated to ~80-90° C. till all the $B(OH)_3$ dissolved and allowed to cool back to room temperature before use. Avoid rapid cooling of the solution, as it causes $B(OH)_3$ to drop out of solution.

TABLE 5

Data for the kinetics study of the synthesis of conical PLA bottlebrush polymers[a]

| | Brush | | | | | | Bottlebrush | | | |
|---|---|---|---|---|---|---|---|---|---|---|
| Time (min) | $M_{n,arm,max}$[b] | $Ð_{arm,max}$[b] | Lactide Conv. Syringe[d] | Lactide Buildup[d] | $M_{n,tBB}$[c] | $Ð_{tBB}$[c] | Nor Conv. (NMR)[d] | Nor Conv. (GPC)[c] | $M_{n,tBB}$ (recal.)[e] | $Ð_{tBB}$ (recal.)[e] |
| 27 | 1,600 | 1.09 | 15.1% | 91.2% | 31,600 | 1.05 | >98% | <1% | 72,000 | 1.14 |
| 41 | 2,300 | 1.07 | 22.0% | 87.0% | 60,400 | 1.05 | >98% | <1% | 139,000 | 1.09 |
| 55 | 2,900 | 1.06 | 27.8% | 84.2% | 101,300 | 1.05 | >98% | <1% | 232,000 | 1.06 |
| 73 | 3,700 | 1.06 | 36.2% | 81.6% | 165,000 | 1.06 | >98% | <1% | 380,000 | 1.05 |

[a]$M_n$ are in g/mol.
[b]GPC done in THF with respect to polylactic acid standards.
[c]GPC done in THF with respect to polystyrene standards.
[d]Calculated from $^1$H NMR
[e]Calculated from bottlebrush standards, see Example 2 for discussion. This data is used to generate FIG. 2.

$$v_o = \left(\frac{N_{brush}^{syn,max}}{N_{bb,max}^{syn,max}}\right)\left(\frac{V_1}{A}\right)(K_{ROP}) \exp(-K_{ROP}t)$$

$N_{brush,sy,max} = 140$ $N_{bb,syn,max} = 185$ $V_1 = 10$ mL $A = 0.25$ $k_{p1} = 200$ 1/(min M$^2$)

$C_{NI} = 0.0122$M $C_{DBU} = 0.00245$M $v_o = 0.1810 \exp(-0.005930t)$

Procedure for the Synthesis of Conical PLA Bottlebrush Polymers (tBB) (Table 6)

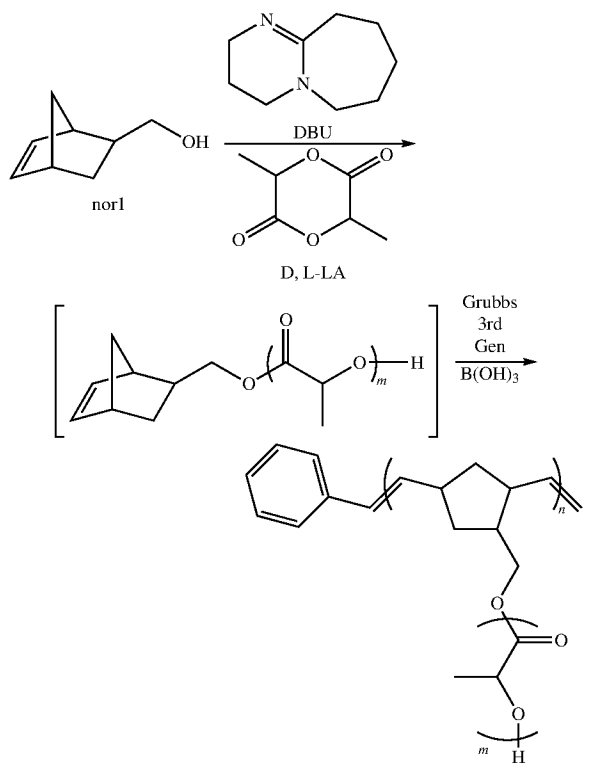

To an oven-dried 25 mL glass vial, lactide (2.46 g, 17.12 mmol, 1.4 ml) and nor1 (30.4 mg, 0.244 mmol) dissolved in 16.6 mL of THF. The polymerization was initiated by adding DBU (6.2 mg, 0.040 mmol) dissolved in 2 mL of THF. This reaction mixture was immediately sucked up into a syringe and the needle was pushed through a septum of a round bottom flask containing $B(OH)_3$ (50.4 mg, 0.816 mmol) and G3 (1.08 mg, 1.02 µmol for $N_{bb}$=200) in 3 mL of THF. This setup (syringe and round bottom flask) was set in a syringe pump. The reaction mixture was added according to the equation below. Upon completion of the addition, a large excess of ethyl vinyl ether (large excess with respect to [Ru]) was added to the reaction mixture. An aliquot (0.1 ml) was taken for $^1$H NMR and GPC for monomer conversion. The rest of the reaction mixture was then poured into methanol and a centrifuge was used to isolate the resulting polymer. The polymer was dried under vacuum and then analyzed by GPC.

Note: In order to get $B(OH)_3$ to dissolve into THF, the solution was heated to ~80-90° C. till all the $B(OH)_3$ dissolved and allowed to cool back to room temperature before use. Avoid rapid cooling of the solution, as it causes $B(OH)_3$ to drop out of solution.

The Following was Derived for tBB $N_{bb}$=200

Flow Rate Equation:

$$v_o = \left(\frac{N_{brush}^{syn,max}}{N_{bb,max}^{syn,max}}\right)\left(\frac{V_1}{A}\right)(K_{ROP})\exp(-K_{ROP}t)$$

$N_{brush,syn,max} = 140$ $N_{bb,sym,max} = 200$ $V_1 = 10$ mL $A = 0.2229$ $k_{ROP} = 200\ 1/(\min M^2)$ $C_{N1} = 0.0122\ M$ $C_{DBU} = 0.00204\ M$ $v_o = 0.1566\ \exp(-0.004942t)$ Model:
Polymer Type=PLA BB
N(syn_max)_backbone=200
N(syn_max)_arms=140
  Mn_arms(syn_max)=10256 g/mol
Shape=cone BB
  Addition started=5.00 min
  Addition finished=84.72 min
  Volume added=10.04 ml
Mn_BB=399517 g/mol
  Mn_arm_max=3633 g/mol
  Mn_arm_avg=1997 g/mol
  Overall Monomer remaining in system=18.3%
  Monomer buildup=81.7%
  Max of Nor buildup=0.6%
  Avg. of buildup=0.5%

TABLE 6

Summarized data for the synthesis of conical bottlebrushes[a]

| | Theory/Model | | | | | | Experimental Data | | | | | |
|---|---|---|---|---|---|---|---|---|---|---|---|---|
| | | Lactide | | | | Lactide | | | Nor Conv. | Nor Conv. | | |
| $N_{bb}$ | $M_{n,arm,max}$ | Buildup | $M_{n,tBB}$ | $M_{n,arm,max}$[b] | $Đ_{arm,max}$[b] | Buildup[d] | $M_{n,tBB}$[c] | $Đ_{tBB}$[c] | (NMR)[d] | (GPC)[c] | $M_{n,tBB}$ (tGPC)[e] | $Đ_{tBB}$ (tGPC)[e] |
| 100 | 3,630 | 81.7% | 200,000 | 3,590 | 1.05 | 81.3% | 59,400 | 1.04 | >98% | >98% | 178,000 | 1.07 |
| 200 | 3,630 | 81.7% | 400,000 | 3,550 | 1.05 | 80.7% | 194,000 | 1.06 | >98% | >98% | 515,000 | 1.12 |
| 500 | 3,630 | 81.7% | 998,000 | 3,590 | 1.05 | 81.7% | 236,000 | 1.08 | >98% | >98% | 895,000 | 1.09 |

[a]$M_n$ are in g/mol.
[b]GPC done in THF with respect to polylactic acid standards.
[c]GPC done in THF with respect to polystyrene standards.
[d]Calculated from $^1$H NMR.
[e]Triple detection GPC.

Procedure for the Synthesis of Ellipsoid PLA Bottlebrush Polymers (eBB) (Table 7)

To an oven-dried 25 mL glass vial, lactide (2.46 g, 17.12 mmol, 1.4 ml) and nor1 (30.4 mg, 0.244 mmol) dissolved in 16.6 mL of THF. The polymerization was initiated by adding DBU (4.14 mg, 0.0272 mmol) dissolved in 2 mL of THF. This reaction mixture was immediately sucked up into a syringe and the needle was pushed through a septum of a round bottom flask containing B(OH)$_3$ (33.6 mg, 0.544 mmol) and G3 (1.08 mg, 1.02 µmol for N$_{bb}$=200) in 2 mL of THF. This setup (syringe and round bottom flask) was set in a syringe pump. The reaction mixture was added according to the equation below. Upon completion of the addition, a large excess of ethyl vinyl ether (large excess with respect to [Ru]) was added to the reaction mixture. An aliquot (0.1 ml) was taken for $^1$H NMR and GPC for monomer conversion. The rest of the reaction mixture was then poured into methanol and a centrifuge was used to isolate the resulting polymer. The polymer was dried under vacuum and then analyzed by GPC.

Note: In order to get B(OH)$_3$ to dissolve into THF, the solution was heated to ~80-90° C. till all the B(OH)$_3$ dissolved and allowed to cool back to room temperature before use. Avoid rapid cooling of the solution, as it causes B(OH)$_3$ to drop out of solution.

Flow Rate Equation:

$$v_o = V_1 \frac{K_{ROP}}{x_{ROP}} \left( \exp(-K_{ROP}t) \sqrt[3]{\exp(2K_{ROP}t)(x_{ROP}^2 - 1) + 2\exp(K_{ROP}t) - 1} - \frac{\exp(K_{ROP}t)(x_{ROP}^2 - 1) + 1}{\sqrt[3]{\exp(2K_{ROP}t)(x_{ROP}^2 - 1) + 2\exp(K_{ROP}t) - 1}} \right)$$

$N_{brush,syn,max} = 140$ $N_{bb,sym,max} = 200$ $V_1 = 10$ mL $x_{ROP} = 0.23$ $k_{ROP} = 200\ 1/(\text{min}\ M^2)$ $C_{N1} = 0.0122\ M$ $C_{DBU} = 0.00136\ M$ $v_o =$ $$0.1437 \left( \exp(-0.003295t) \sqrt[3]{2\exp(0.003295t) - 0.9471\exp(0.006589t) - 1} - \frac{1 - 0.9471\exp(0.003295t)}{\sqrt[3]{2\exp(0.003295t) - 0.9471\exp(0.006589t) - 1}} \right)$$

Model:
Polymer Type=PLA BB
N(syn_max)_backbone=200
N(syn_max)_arms=140
 Mn_arms(syn_max)=10256 g/mol
Shape=ellipsoid BB
 Addition started=5.00 min
 Addition finished=79.33 min
 Volume added=10.02 ml
Mn_BB=398022 g/mol
 Mn_arm_max=2483 g/mol
 Mn_arm_avg=1970 g/mol
 Overall Monomer remaining in system=18.4%
 Monomer buildup=81.7%
 Max of Nor buildup=9.0%
 Avg. of buildup=0.5%

Procedure for the Synthesis of Concave Elliptical Cone PLA Bottlebrush Polymers (vBB) (Table 8)

To an oven-dried 25 mL glass vial, lactide (2.46 g, 17.12 mmol, 1.4 ml) and nor1 (30.4 mg, 0.244 mmol) dissolved in 16.6 mL of THF. The polymerization was initiated by adding DBU (12.42 mg, 0.0816 mmol) dissolved in 2 mL of THF. This reaction mixture was immediately sucked up into a syringe and the needle was pushed through a septum of a round bottom flask containing B(OH)$_3$ (100.8 mg, 1.632 mmol) and G3 (1.08 mg, 1.02 µmol for N$_{bb}$=200) in 4 mL of THF. This setup (syringe and round bottom flask) was set in a syringe pump. The reaction mixture was added according to the equation below. Upon completion of the addition, a large excess of ethyl vinyl ether (large excess with respect to [Ru]) was added to the reaction mixture. An aliquot (0.1 ml) was taken for $^1$H NMR and GPC for monomer conversion. The rest of the reaction mixture was then poured into methanol and a centrifuge was used to isolate the resulting polymer. The polymer was dried under vacuum and then analyzed by GPC.

Note: In order to get B(OH)$_3$ to dissolve into THF, the solution was heated to ~80-90° C. till all the B(OH)$_3$ dissolved and allowed to cool back to room temperature before use. Avoid rapid cooling of the solution, as it causes B(OH)$_3$ to drop out of solution.

TABLE 7

Summarized data for the synthesis of ellipsoid bottlebrushes[a]

| Theory/Model | | | | | | Experimental Data | | | | | | |
|---|---|---|---|---|---|---|---|---|---|---|---|---|
| $N_{bb}$ | $M_{n,arm,max}$ | Lactide Buildup | $M_{n,eBB}$ | $M_{n,arm,max}$[b] | $Ð_{arm,max}$[b] | Lactide Buildup[d] | $M_{n,eBB}$[c] | $Ð_{eBB}$[c] | Nor Conv. (NMR)[d] | Nor Conv. (GPC)[c] | $M_{n,eBB}$ (tGPC)[e] | $Ð_{eBB}$ (tGPC)[e] |
| 200 | 2,480 | 81.7% | 400,000 | 2,440 | 1.06 | 81.5% | 198,000 | 1.05 | >98% | >98% | 522,000 | 1.13 |

[a]$M_n$ are in g/mol.
[b]GPC done in THF with respect to polylactic acid standards.
[c]GPC done in THF with respect to polystyrene standards.
[d]Calculated from $^1$H NMR.
[e]Triple detection GPC.

TABLE 8

Summarized data for the synthesis of concave elliptical cone bottlebrushes[a]

| | Theory/Model | | | | | | Experimental Data | | | | | |
|---|---|---|---|---|---|---|---|---|---|---|---|---|
| | | Lactide | | | | Lactide | | | Nor Conv. | Nor Conv. | $M_{n,vBB}$ | $Đ_{vBB}$ |
| $N_{bb}$ | $M_{n,arm,max}$ | Buildup | $M_{n,vBB}$ | $M_{n,arm,max}{}^b$ | $Đ_{arm,max}{}^b$ | Buildup[d] | $M_{n,vBB}{}^c$ | $Đ_{vBB}{}^c$ | (NMR)[d] | (GPC)[c] | (tGPC)[e] | (tGPC)[e] |
| 200 | 6,270 | 81.7% | 400,000 | 6,340 | 1.05 | 81.2% | 190,000 | 1.05 | >98% | >98% | 521,000 | 1.14 |

[a] $M_n$ are in g/mol.
[b] GPC done in THF with respect to polylactic acid standards.
[c] GPC done in THF with respect to polystyrene standards.
[d] Calculated from $^1$H NMR.
[e] Triple detection GPC.

Flow Rate Equation:

$$v_o = \left| \frac{V_1}{\exp(K_{ROP}t_{delay})x_{ROP} - \exp(K_{ROP}t_{delay}) + 1} \right|$$

$$\left( \frac{K_{ROP}(\exp(K_{ROP}t)(2\exp(K_{ROP}t_{delay})x_{ROP} - 2\exp(K_{ROP}) + 1) - \exp(2K_{ROP}t_{delay})(x_{ROP}-1))}{\sqrt[2]{\frac{(\exp(K_{ROP}t) + \exp(K_{ROP}t_{delay}))}{(2\exp(K_{ROP}t)\exp(K_{ROP}t_{delay})x_{ROP} - 2*\exp(K_{ROP}t_{delay}) + 1) + \exp(K_{ROP}t_{delay})}}} \right.$$

$$\left. -K_{ROP}\exp(-K_{ROP}t) \sqrt[2]{\frac{(\exp(K_{ROP}t) + \exp(K_{ROP}t_{delay}))}{(\exp(K_{ROP}t)(2\exp(K_{ROP}t_{delay})x_{ROP} - 2\exp(K_{ROP}t_{delay}) + 1) + \exp(K_{ROP}t_{delay}))}} \right)$$

$N_{brush,syn,max} = 140$ $N_{bb,sym,max} = 200$ $V_1 = 10$ mL $x_{ROP} = 0.70$ $k_{ROP} = 200 \ 1/(\text{min } M^2)$ $C_{N1} = 0.0122 \ M$ $C_{DBU} = 0.00408 \ M$ $$v_o = 14.66 \left( \frac{(0.003653 \exp(0.009884t) + 0.003273)}{\sqrt[2]{(\exp(0.009884t) - 1.051)(0.3696 \exp(0.009884t) + 1.051)}} - \right.$$

$$\left. \frac{0.009884 \exp(-0.009884t)}{\sqrt[2]{(\exp(0.009884t) - 1.051)(0.3696 \exp(0.009884t) + 1.051)}} \right)$$

Model:
Polymer Type=PLA BB
N(syn_max)_backbone=200
N(syn_max)_arms=140
  Mn_arms(syn_max)=10256 g/mol
Shape=concave elliptical BB
  Addition started=5.00 min
  Addition finished=95.87 min
  Volume added=10.04 ml
Mn_BB=397770 g/mol
  Mn_arm_max=6267 g/mol
  Mn_arm_avg=1989 g/mol
  Overall Monomer remaining in system=18.1%
  Monomer buildup=81.7%
  Max of Nor buildup=5.1%
  Avg. of buildup=0.5%

Example 7. Kinetics and Synthesis of PDMS Bottlebrush Polymers

Procedure for the Kinetic Analysis of the Anionic Ring Opening Polymerization (ROP) of Siloxane to Produce PDMS To an oven-dried 50 mL round bottom flask, nor1 (46.3 mg, 0.373 mmol) were dissolved into 1.7 ml of toluene. t-BuLi (0.22 ml, 0.373 mmol, 1.7 M in pentane) was added dropwise at room temperature and stirred for 10 min. Next, hexamethylcyclotrisiloxane (166 mg, 0.746 mmol) dissolved in 1.4 ml of toluene and added to the t-BuLi/nor1 mixture. The mixture is allowed to stir for 30 mins before a second addition of hexamethylcyclotrisiloxane (5.432 g, 24.4 mmol, 6 ml) dissolved in 15.4 ml of THF. The addition of the second batch of hexamethylcyclotrisiloxane is defined as the starting time for the polymerization. At various time point (5, 10, 15, 20, 25, 30, 45, 60, 90, 120 min), 150 µL aliquots were removed from the reaction mixture and were injected into vials containing a large excess of TMSCl to be analyzed by GPC.

$$r_p = k_{app(ROP-Si)}[Si]$$

$$\ln\left(\frac{[Si]}{[Si]_o}\right) = -k_{app(ROP-Si)}t$$

$$k_{app(ROP-Si)} = 0.0186 \text{ min}^{-1}$$

Compatibility Study of Anionic Ring Opening Polymerization (ROP) of Siloxane Reagents with ROMP of Nor2 (Table 9)

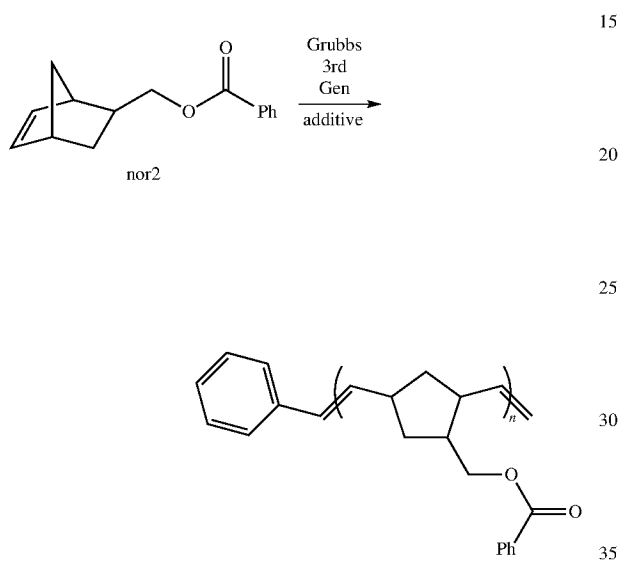

See ROMP experiments (Example 4) above for procedure.

TABLE 9

Summarized data for ROMP of nor2 with additives related to the synthesis of PDMS[a,f]

| Run | N | Additive | Eq. additive to G3 | Nor Conv.[c] | $M_{n,theory}$[d] | $M_n$[d,e] | Đ[e] |
|---|---|---|---|---|---|---|---|
| 1[b] | 500 | none | — | >98 | 114,000 | 113,000 | 1.03 |
| 2 | 500 | hexamethylcyclotrisiloxane | 5000 | >98 | 114,000 | 110,000 | 1.04 |
| 3 | 500 | TMSCl | 50 | >98 | 114,000 | 110,000 | 1.03 |
| 4 | 500 | LiCl | 50 | >98 | 114,000 | 116,000 | 1.03 |

[a][G3] = 0.047 mM, [Nor] = 9.4 mM, THF, 25° C.

[b]Same data as Table Run 2.

[c]Calculated from $^1$H NMR.

[d]$M_{n,theory}$ = (Nor. Conv.)*N*228 g/mol.

[e]GPC done in THF with respect to polystyrene standards.

[f]Polymerizations were performed with endo/exo monomer mixture and $M_n$ are in g/mol.

Procedure for the Synthesis of Cylindrical PDMS Bottle-brush Polymers (Table 10)

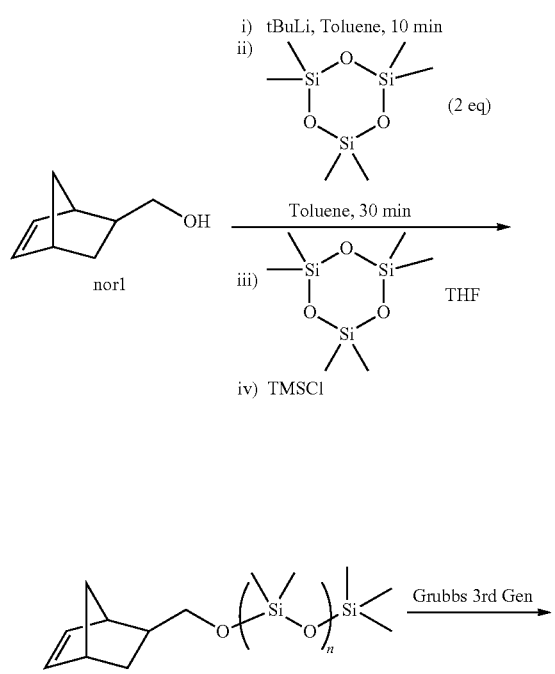

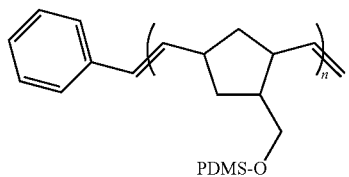

Figure 7:
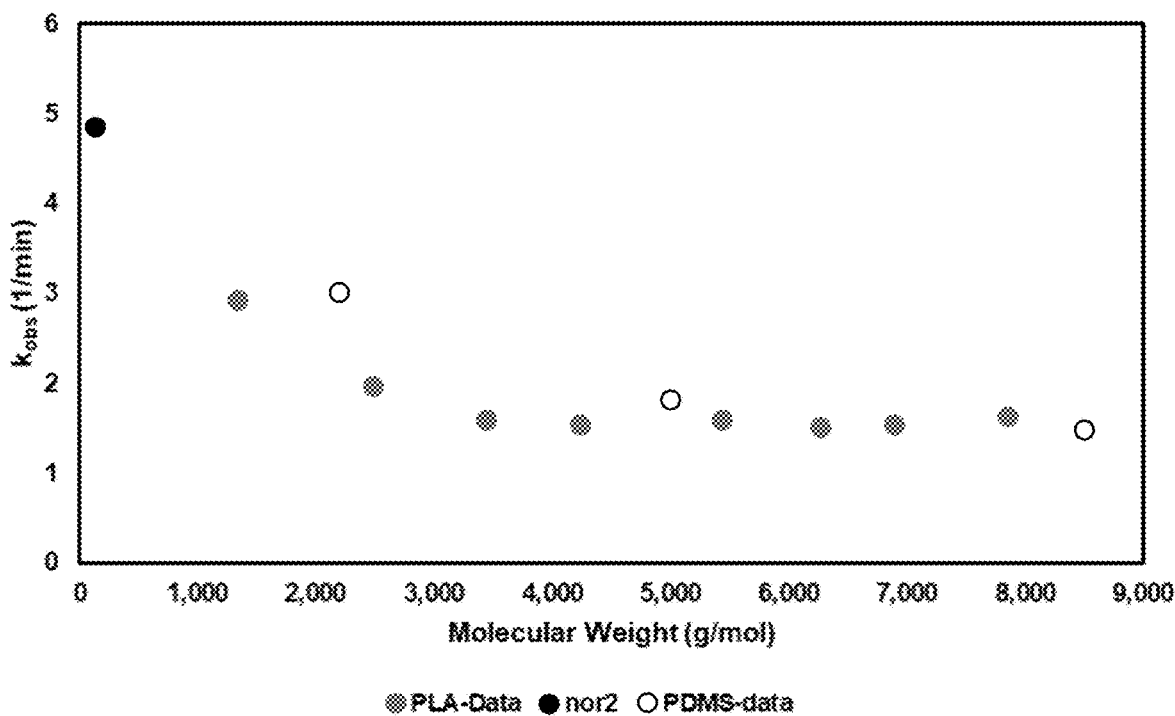
FIG. 7. Plot of the dependence of ROMP of macromonomers rate vs. molecular weight.

To an oven-dried 20 mL glass vial, nor1 (46.3 mg, 0.373 mmol) were dissolved into 1.7 ml of toluene. t-BuLi (0.22 ml, 0.373 mmol, 1.7 M in pentane) was added dropwise at room temperature (2 min) and stirred for 10 min. Next, hexamethylcyclotrisiloxane (166 mg, 0.746 mmol) dissolved in 1.4 ml of toluene and added to the t-BuLi/nor1 mixture. The mixture is allowed to stir for 30 mins before a second addition of hexamethylcyclotrisiloxane (5.432 g, 24.4 mmol, 6 ml) dissolved in 15.4 ml of THF. The addition of the second batch of hexamethylcyclotrisiloxane is defined as the starting time for the polymerization. The polymerization was stopped at the specified time (0.166, 0.333, 0.5, 1, 2, 5 min) with an addition of TMSCl (805 mg, 7.46 mmol) in THF, 3.5 ml. A 100 μL aliquot is taken at this point for GPC analysis (FIG. 7).

ROMP was initiated by the addition of G3 (1.65 mg, 0.00186 mmol) in 0.5 mL of THF. The progression of the reaction was monitored by taking 150 μL aliquots for GPC analysis. An aliquot (0.1 ml) was taken for $^1$H NMR and GPC for monomer conversion.

TABLE 10

Summarized data for ROMP of PDMS arms[a]

| Run | $M_{n,arm}$[b] | $Đ_{arm}$[b] | $N_{bb}$ | $M_{n,cBB,theory}$ | $M_{n,cBB}$[b] | $Đ_{cBB}$[b] | Nor Conv. (NMR)[c] | Nor Conv. (GPC)[b] | $k_{obs}$ (1/min) |
|---|---|---|---|---|---|---|---|---|---|
| 1 | 2,200 | 1.13 | 200 | 440,000 | 156,000 | 1.06 | >98% | >98% | 1.47 |
| 2 | 5,500 | 1.05 | 200 | 1,100,000 | 215,000 | 1.08 | >98% | >98% | 1.81 |
| 3 | 8,500 | 1.04 | 200 | 1,700,000 | 294,000 | 1.08 | >98% | >98% | 3.02 |

[a]$M_n$ are in g/mol.
[b]GPC done in THF with respect to polystyrene standards.
[c]Calculated from $^1$H NMR.
[d]Triple detection GPC.

Procedure for the Synthesis of Conical PDMS Bottlebrush Polymers (Table 11)

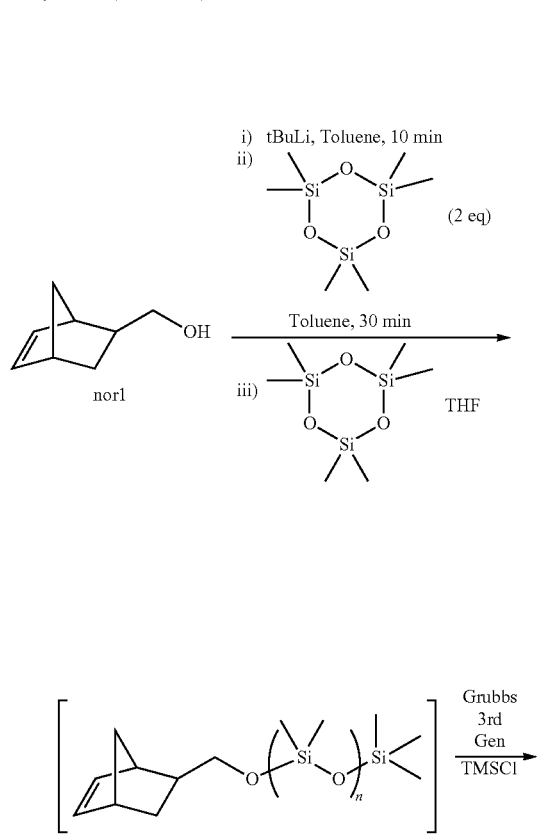

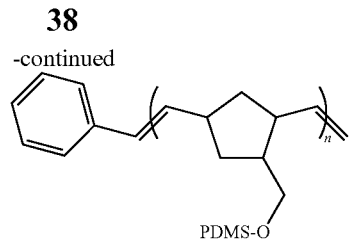

To an oven-dried 20 mL glass vial, nor1 (18.5 mg, 0.149 mmol) were dissolved into 0.75 ml of toluene. t-BuLi (0.088 ml, 0.149 mmol, 1.7 M in pentane) was added dropwise at room temperature (2 min) and stirred for 10 min. Next, hexamethylcyclotrisiloxane (67 mg, 0.30 mmol) dissolved in 0.5 ml of toluene and added to the t-BuLi/nor1 mixture. The mixture is allowed to stir for 30 mins before a second addition of hexamethylcyclotrisiloxane (2.16 g, 9.7 mmol, 2.4 ml) dissolved in 6.2 ml of THF. The addition of the second batch of hexamethylcyclotrisiloxane is defined as the starting time for the polymerization. This reaction mixture was immediately sucked up into a syringe and the needle was pushed through a silicon septum of a round bottom flask containing TMSCl (323 mg, 3 mmol) and G3 (0.66 mg, 0.75 μmol) in 2 mL of THF. This setup (syringe and round bottom flask) was brought out of the glovebox and the syringe was set in a syringe pump. The reaction mixture was added according to the equation below. Upon completion of the addition, a large excess of ethyl vinyl ether (large excess with respect to [Ru]) was added to the reaction mixture. An aliquot (0.1 ml) was taken for $^1$H NMR and GPC for monomer conversion. The rest of the reaction mixture was then poured into methanol and a centrifuge was used to isolate the resulting polymer. The polymer was dried under vacuum and then analyzed by GPC.

TABLE 11

Summarized data for the synthesis of conical PDMS bottlebrushes[a]

| Theory/Model | | | Experimental Data | | | | Nor Conv. (NMR)[c] | Nor Conv. (GPC)[b] |
|---|---|---|---|---|---|---|---|---|
| $N_{bb}$ | $M_{n,arm,max}$ | $M_{n,tBB}$ | $M_{n,arm,max}^{b}$ | $Đ_{arm,max}^{b}$ | $M_{n,tBB}^{b}$ | $Đ_{tBB}^{b}$ | | |
| 200 | 6,730 | 767,000 | 6,720 | 1.03 | 153,000 | 1.18 | >98% | >98% |

[a]$M_n$ are in g/mol.
[b]GPC done in THF with respect to polystyrene standards d.
[c]Calculated from $^1$H NMR.
[d]Triple detection GPC.

The Following was Derived for tBB $N_{bb}=200$

Flow Rate Equation:

$$v_o = \left(\frac{N_{brush}^{syn,max}}{N_{bb,max}^{syn,max}}\right)\left(\frac{V_1}{A}\right)(k_{p,Si})\exp(-k_{p,Si}t)$$

$N_{brush,syn,max} = 203$ $N_{bb,syn,max} = 200$ $V_1 = 10$ mL $A = 0.38$ $k_{p,Si} = 0.013 \ 1/\text{min}$ $v_o = 0.3467 \exp(-0.013t)$ Model:
Polymer Type=PDMS BB
N(syn_max)_backbone=200
N(syn_max)_arms=203
   Mn_arms(syn_max)=15133 g/mol
Shape=cone BB
   Addition started=5.00 min
   Addition finished=44.11 min
   Volume added=10.00 ml
Mn_BB=767067 g/mol
   Mn_arm_max=6728 g/mol
   Mn_arm_avg=3853 g/mol
   Overall Monomer remaining in system=25.0%
   Monomer buildup=75.0%
   Max of Nor buildup=1.6%
   Avg. of buildup=1.4%

Example 8. Synthesis of Asymmetric Composition Conical Bottlebrush Polymers (dBB) (Table 12)

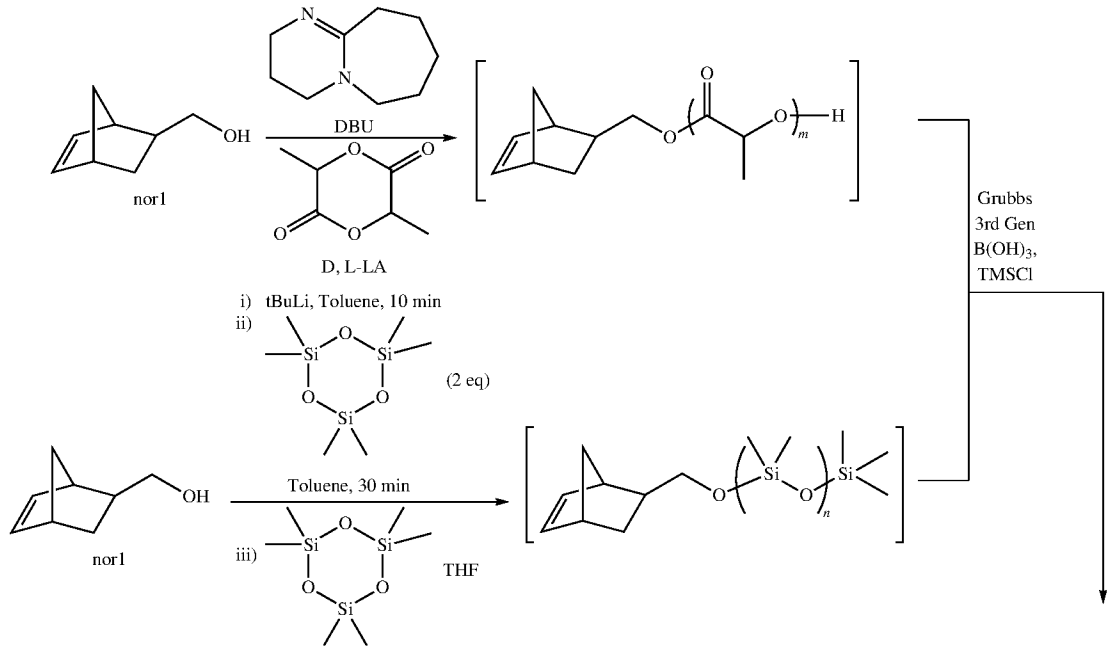

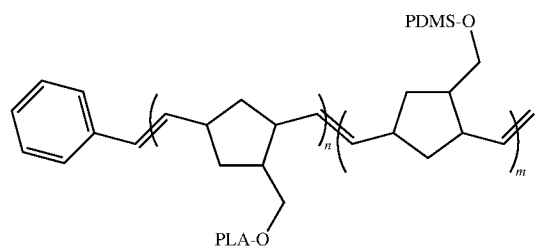

To an oven-dried 20 mL glass vial, lactide (1.23 g, 8.56 mmol, 0.7 ml) and nor1 (15.2 mg, 0.122 mmol) dissolved in 8.3 mL of THF. A stock solution of DBU (3.73 mg, 0.0245 mmol) dissolved in 1 mL of THF was made and both flasks were set aside until the PDMS ROP was prepared.

In a separate oven-dried 20 mL vial, nor1 (18.5 mg, 0.149 mmol) were dissolved into 0.75 ml of toluene. t-BuLi (0.088 ml, 0.149 mmol, 1.7 M in pentane) was added dropwise at room temperature (2 min) and stirred for 10 min. Next, hexamethylcyclotrisiloxane (67 mg, 0.30 mmol) dissolved in 0.5 ml of toluene and added to the t-BuLi/nor1 mixture. The mixture is allowed to stir for 30 mins.

A round bottom flask containing TMSCl (323 mg, 3 mmol), B(OH)$_3$ (30.3 mg, 0.490 mmol) and G3 (0.66 mg, 0.75 μmol) in 2 mL of THF was also prepared.

Both polymerizations were initiated at the same time with the second addition of hexamethylcyclotrisiloxane (2.16 g, 9.7 mmol, 2.4 ml) dissolved in 6.2 ml of THF to the siloxane flask and the addition of DBU to the lactide flask. Both reaction mixtures were immediately sucked up into a syringe and the needle was pushed through a silicon septum of the G3 containing flask. This setup (syringe and round bottom flask) was set in a syringe pump. The reaction mixture was added according to the equation below. Upon completion of the addition, a large excess of ethyl vinyl ether (large excess with respect to [Ru]) was added to the reaction mixture. An aliquot (0.1 ml) was taken for $^1$H NMR and GPC for monomer conversion. The rest of the reaction mixture was then poured into methanol and a centrifuge was used to isolate the resulting polymer. The polymer was dried under vacuum and then analyzed by GPC.

Note: In order to get B(OH)$_3$ to dissolve into THF, the solution was heated to ~80-90° C. till all the B(OH)$_3$ dissolved and allowed to cool back to room temperature before use. Avoid rapid cooling of the solution, as it causes B(OH)$_3$ to drop out of solution.

-continued $k_{p1} = 200 \ 1/(\text{min } M^2)$ $C_{N1} = 0.0150 \ M$ $C_{DBU} = 0.00441 \ M$ $v_o = 0.3070 \ \exp(-0.01318t)$ Model:
Polymer Type=dBB PLA & PDMS
N(syn_max)_backbone_Total=199
 N(syn_max)_backbone_PLA=100
 N(syn_max)_backbone_PDMS=100
N(syn_max)_arms_PLA=139
 Mn_arms(syn_max)_PLA=10183 g/mol
N(syn_max)_arms_PDMS=203
 Mn_arms(syn_max)_PDMS=15133 g/mol
Shape=cone BB
 Addition started=5.00 min
 Addition finished=51.45 min
 Volume added=9.98 ml
Mn_BB=725381 g/mol
 Mn_arm_max_PLA=5139 g/mol
 Mn_arm_avg_PLA=2956 g/mol
 Overall lactide remaining in system=27.8%
 lactide buildup=72.2%
 Mn_arm_max_PDMS=7505 g/mol
 Mn_arm_avg_PDMS=4320 g/mol
 Overall Siloxane remaining in system=27.6%
 Siloxane buildup=72.4%
 Max of Nor buildup=1.1%
 Avg. of buildup=1.0%

TABLE 12

Summarized data for the synthesis of conical dBB[a]

| | Theory/Model | | | | Experimental Data | | | | | |
|---|---|---|---|---|---|---|---|---|---|---|
| Polymer | $N_{bb}$ | $M_{n,arm,max}$ | Lactide Buildup | $M_{n,dBB}$ | $M_{n,arm,max}$[b] | $D_{arm,max}$[b] | Lactide Buildup[d] | $M_{n,dBB}$[c] | $D_{dBB}$[c] | Nor Conv. (NMR)[d] | Nor Conv. (GPC)[c] |
| PLA | 100 | 5,140 | 72.2% | 725,000 | 5,120 | 1.05 | 71.8% | 120,000 | 1.19 | >98% | 98% |
| PDMS | 100 | 7,500 | NA | | 7,420 | 1.05 | NA | | | | |

[a]$M_n$ are in g/mol.
[b]GPC done in THF with respect to polystyrene standards.
[c]GPC done in THF with respect to polystyrene standards.
[d]Calculated from $^1$H NMR.
NA = Not applicable.

Flow Rate Equation:

$$v_o = \left(\frac{N_{brush}^{syn,max}}{N_{bb,max}^{syn,max}}\right)\left(\frac{V_1}{A}\right)(K_{ROP})\exp(-K_{ROP}t)$$

Figure 8:
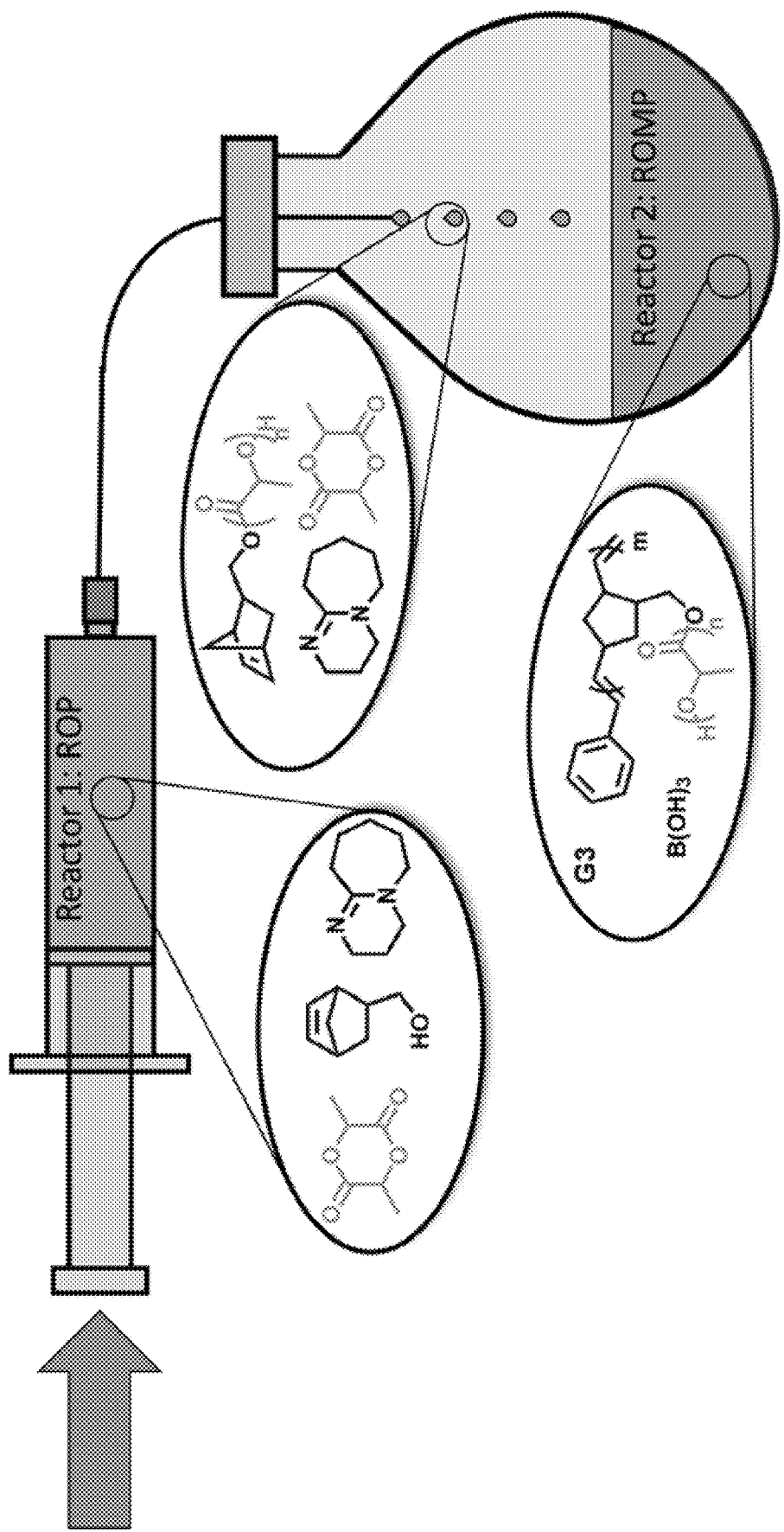
FIG. 8. Semibatch method for single macromonomer feed.

$N_{brush,syn,max} = 140$ $N_{bb,syn,max} = 100$ $V_1 = 10 \ \text{mL}$ $A = 0.6$ Example 9. Derivation of Flow Rate Equations and Development of Mathematical Model Derivation of Differential Equations (for the Single Feed Semi-Batch Method; FIG. 8)

The derivation is for the synthesis of PLA based bottlebrushes for clarity, however the mathematical model is general and can be directly applied to the synthesis of PDMS bottlebrushes.

The system has 2 species (lactide, norbornene) of interest that are included in to the mathematical model. The concentration of DBU remains constant in the first reactor and DBU is quantitatively quenched in the second reactor, thus a differential equation is not required. Boric acid is not involved in any synthetic step for the bottlebrush synthesis, it is only used a quench reagent, thus it is not important for the mathematical model. G3 is zero order in the reaction rate of ROMP, thus the continual dilution of G3 is unimportant for ROMP reaction rate.

$$\text{Lac} + \text{Nor} \rightarrow \text{PLA} \quad r_{ROP} = k_{ROP} C_{L1} C_{N1} C_{DBU}$$

$$\text{Nor} + \text{G3} \rightarrow \text{Poly(Nor)} \quad r_{ROMP} = k_{ROMP} C_{N2}$$

Volume changes
  $V_1$=Volume in reactor 1 (L)
  $V_2$=Volume in reactor 2 (L)
  $v_o$=Volumetric flow rate from syringe to reactor 2 (L/min)

$$\frac{dV_1}{dt} = -v_o(t)$$

$$\frac{dV_2}{dt} = v_o(t)$$

Mole balance of lactide (Lac) in Reactor 1:
  $F_L$=Molar flow rate of lactide out of reactor 1 (mol/min)
  $r_{ROP}$=Rate for ROP (mol/(min L))
  $N_{L1}$=moles of lactide in reactor 1 (mol)
  t=Time (min)
  $C_{L1}$=Concentration of lactide in reactor 1 (mol/L)
  $C_{L0}$=Initial concentration of lactide in reactor 1 (mol/L)
  $k_{ROP}$=Rate constant for ROP (1/(min $M^2$))
  $C_{N1}$=Concentration of Nor1 in reactor 1 (mol/L)
  $C_{DBU}$ Concentration of DBU in reactor 1 (mol/L)

In − Out + Generation − Consumption = Accumulation $$0 - F_L + 0 - r_{ROP} V_1 = \frac{dN_{L1}}{dt}$$

Simplify:

$$\frac{dN_{L1}}{dt} = -F_L - r_{ROP} V_1 = -C_{L1} v_o - r_{ROP} V_1$$

$$\left\{ \frac{dN_{L1}}{dt} = \frac{d(V_1 C_{L1})}{dt} = C_{L1} \frac{dV_1}{dt} + V_1 \frac{dC_{L1}}{dt} = C_{L1}(-v_o) + V_1 \frac{dC_{L1}}{dt} \right\}$$

$$C_{L1}(-v_o) + V_1 \frac{dC_{L1}}{dt} = -C_{L1} v_o - r_{ROP} V_1$$

$$\frac{dC_{L1}}{dt} = -\frac{v_o C_{L1}}{V_1} - r_{ROP} + \frac{v_o C_{L1}}{V_1}$$

$$\frac{dC_{L1}}{dt} = -r_{ROP} = -k_{ROP} C_{N1} C_{DBU} C_{L1}$$

$$K_{ROP} = k_{ROP} C_{N1} C_{DBU} = \text{constant}$$

$$\frac{dC_{L1}}{dt} = -K_{ROP} C_{L1}$$

Integrate:

$$\ln\left(\frac{C_{L1}}{C_{L0}}\right) = -K_{ROP} t$$

$$C_{L1} = C_{L0} \exp(-K_{ROP} t)$$

Mole balance of lactide (L) in reactor 2:
  $N_{L2}$=moles of lactide in reactor 2 (mol)
  $C_{L2}$=Concentration of lactide in reactor 2 (mol/L)

In − Out + Generation − Consumption = Accumulation $$F_L - 0 + 0 - 0 = \frac{dN_{L2}}{dt}$$

Simplify:

$$\frac{dN_{L2}}{dt} = F_L = C_{L1} v_o$$

$$\left\{ \frac{dN_{L2}}{dt} = \frac{d(V_2 C_{L2})}{dt} = C_{L2} \frac{dV_2}{dt} + V_2 \frac{dC_{L2}}{dt} = C_{L2} v_o + V_2 \frac{dC_{L2}}{dt} \right\}$$

$$C_{L2} v_o + V_2 \frac{dC_{L2}}{dt} = C_{L1} v_o$$

$$\frac{dC_{L2}}{dt} = \frac{C_{L1} v_o}{V_2} - \frac{C_{L2}}{V_2} v_o$$

$$\frac{dC_{L2}}{dt} = \frac{v_o}{V_2}(C_{L1} - C_{L2})$$

Mole balance of norbornene (Nor) in reactor 1:
  $N_{N1}$=moles of norbornene in reactor 1 (mol)
  $C_{N0}$=Initial concentration of norbornene in reactor 1 (mol/L)
  $F_N$=Molar flow rate of norbornene out of reactor 1 (mol/min)

In − Out + Generation − Consumption = Accumulation $$0 - F_N + 0 - 0 = \frac{dN_{N1}}{dt}$$

Simplify:

$$\frac{dN_{N1}}{dt} = -F_N = -C_{N1} v_o$$

$$\left\{ \frac{dN_{N1}}{dt} = \frac{d(V_1 C_{N1})}{dt} = C_{N1} \frac{dV_1}{dt} + V_1 \frac{dC_{N1}}{dt} = C_{N1}(-v_o) + V_1 \frac{dC_{N1}}{dt} \right\}$$

$$C_{N1}(-v_o) + V_1 \frac{dC_{N1}}{dt} = -C_{N1} v_o$$

$$\frac{dC_{N1}}{dt} = 0$$

Integrate:

$$C_{N1} = C_{N0}$$

Mole balance of norbornene (N) in reactor 2:
  $N_{N2}$=moles of norbornene in reactor 2 (mol)
  $C_{N2}$=Initial concentration of norbornene in reactor 2 (mol/L)
  $r_{ROMP}$=Rate law for ROMP (mol/(min L))
  $k_{ROMP}$=Rate constant for ROP (1/min)

In − Out + Generation − Consumption = Accumulation $$F_N - 0 + 0 - r_{ROMP} V_2 = \frac{dN_{N2}}{dt}$$

Simplify:

$$\frac{dN_{N2}}{dt} = F_N - r_{ROMP}V_2 = C_{N1}v_o - r_{ROMP}V_2$$

$$\left\{\frac{dN_{N2}}{dt} = \frac{d(V_2 C_{N2})}{dt} = C_{N2}\frac{dV_2}{dt} + V_2 \frac{dC_{N2}}{dt} = C_{N2}v_o + V_2\frac{dC_{N2}}{dt}\right\}$$

$$C_{N2}v_o + V_2 \frac{dC_{N2}}{dt} = C_{N1}v_o - r_{ROMP}V_2$$

$$\frac{dC_{N2}}{dt} = \frac{v_o C_{N1}}{V_2} - r_{ROMP} - \frac{C_{N2}}{V_2}v_o$$

$$\frac{dC_{N2}}{dt} = \frac{v_o}{V_2}(C_{N1} - C_{N2}) - r_{ROMP} = \frac{v_o}{V_2}(C_{N1} - C_{N2}) - k_{ROMP}C_{N2}$$

$$\frac{dC_{N2}}{dt} = \frac{v_o}{V_2}(C_{N0} - C_{N2}) - k_{ROMP}C_{N2}$$

Figure 9:
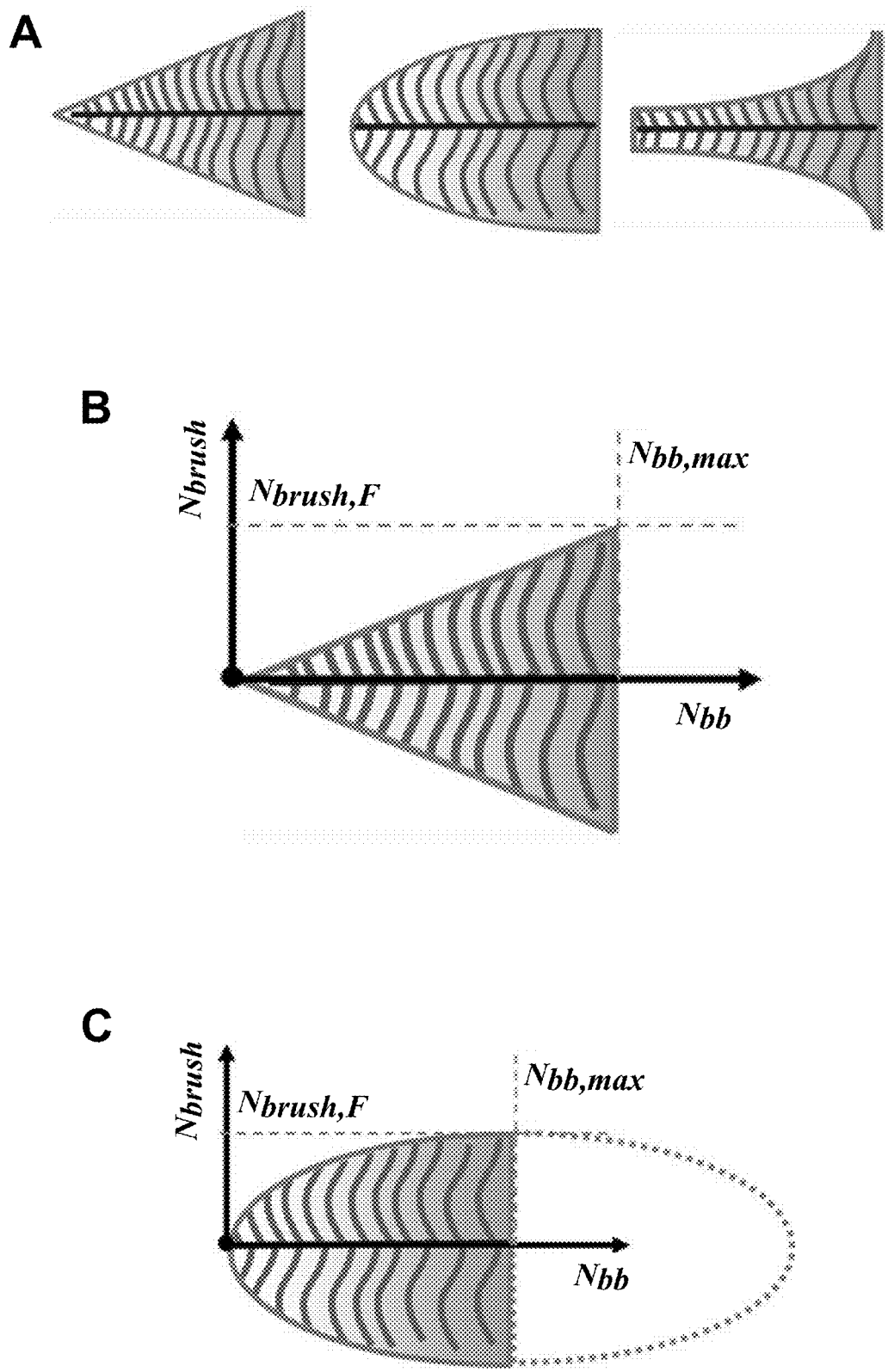
FIG. 9. A) Derivation for volumetric flow rates for different bottle brish shapes. B) Cone: Constraint: Constant. C) Half ellipsoid. D) Concave elliptical cone. E) Football (left) and hourglass (right) shapes.
Figure 9:
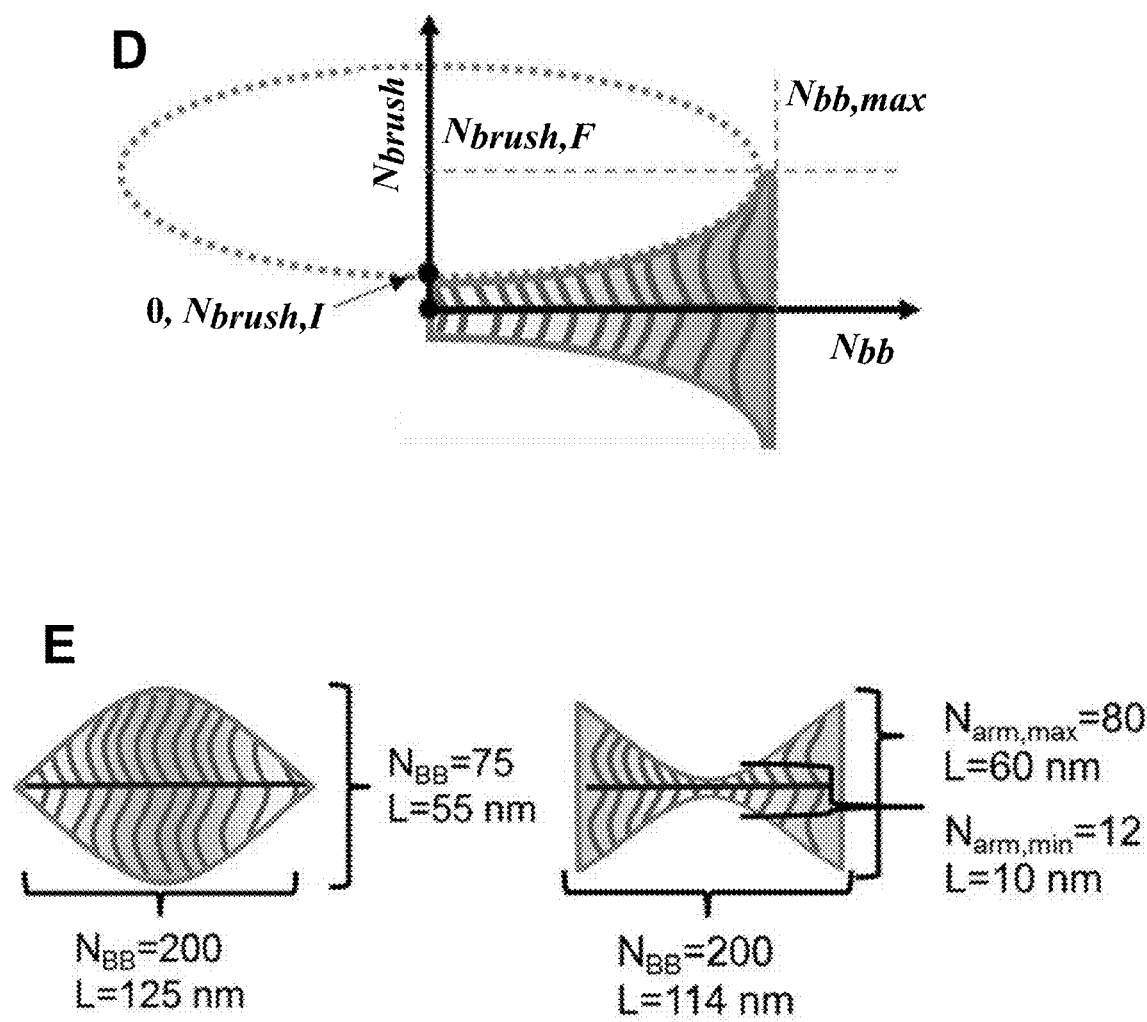

Derivation for Volumetric Flow Rates (FIG. 9)

The flow rate $v_o$ dictates the topology of the produced bottlebrush polymers. The flow rate for three different geometric shapes (cone, half ellipsoid, concave elliptical cone) are derived below.

The derivations of the different shape bottlebrushes is focused on controlling the rate in which the brush length grows ($N_{brush}$) with respect to the rate in which the backbone grows ($N_{bb}$). This relationship is the geometric constraint and each shape has a unique constraint. The derivation for each follows a similar process where $N_{brush}$, and $N_{bb}$ was plugged into the constraint and following some rearrangement an equation for flow rate was derived. The derivation for $N_{brush}$ is fairly simple and shown below. However, the derivation for $N_{bb}$ is not as straight forward, thus the assumption that the rate of reaction for ROMP is very fast compared to ROP ($r_{ROMP} \gg r_{ROP}$) has been made. This assumption simplifies the derivation and this assumptions validity is double checked with numerical simulations.

$N_{brush}$=Degree of polymerization of the brush at time 't'
$N_{bb}$=Degree of polymerization of the backbone at time 't'
$N_{brush}^{syn,max}$=Degree of polymerization of the backbone, the maximum length possible for a given synthesis at 100% cony. [Ex. $N_{brush}^{syn,max}$=(moles of lactide)/(moles of nor13)]
$N_{bb,max}^{syn,max}$=Degree of polymerization of the backbone, the maximum length possible for a given synthesis at 100% cony. [Ex. $N_{bb}^{syn,max}$=(moles of nor1)/(moles of G3)]$x_{ROP}$=Conversion of lactide in reactor 1
$N_{N0}$=Initial moles of norbornene in the system
$N_{G3}$=Moles of Grubbs in the system $$N_{brush} = N_{brush}^{syn,max} x_{ROP}$$

Plug in the definition of conversion.

$$N_{brush} = N_{brush}^{syn,max}\left(\frac{C_{L0} - C_{L1}}{C_{L0}}\right)$$

Plug in $C_{L1}$ from differential equations above.

$$N_{brush} = N_{brush}^{syn,max}\left[\frac{C_{L0} - C_{L0}\exp(-K_{ROP}t)}{C_{L0}}\right]$$

Simplify $$N_{brush} = N_{brush}^{syn,max}[1 - \exp(-K_{ROP}t)]$$

$$\left\{N_{brush}^{syn,max} = \frac{C_{L0}}{C_{N0}}\right\}$$

$$N_{bb} = \frac{N_{bb,max}^{syn,max}}{V_1}\int_0^t v_o dt$$

$$\left\{N_{bb,max}^{syn,max} = \frac{N_{N0}}{N_{G3}}\right\}$$

Cone:

Constraint: Constant $$\frac{N_{brush}}{N_{bb}} = \text{constant} = A$$

A=Growth rate
Plug $N_{brush}$ and $N_{bb}$ into the constraint.

$$\frac{N_{brush}}{N_{bb}} = A = \frac{N_{brush}^{syn,max}[1 - \exp(-K_{ROP}t)]}{\frac{N_{bb,max}^{syn,max}}{V_1}\int_0^t v_o dt}$$

Simplify and isolate flow rate integral $$\int_0^t v_o dt = \left(\frac{N_{brush}^{syn,max}}{N_{bb,max}^{syn,max}}\right)\left(\frac{V_1}{A}\right)[1 - \exp(-K_{ROP}t)]$$

Differentiate with respect to time $$v_o = \left(\frac{N_{brush}^{syn,max}}{N_{bb,max}^{syn,max}}\right)\left(\frac{V_1}{A}\right)(K_{ROP})\exp(-K_{ROP}t)$$

Half ellipsoid:

Constraint: Equation for an ellipse centered at ($N_{bb,max}$,0) with an x-axis length of $2*N_{bb,max}$ and y-axis length of N $2*N_{brush,F}$, ($N_{brush,F}$=instantaneous brush length when $N_b = N_{bb,max}$). For this synthesis a predetermined final brush length is required. In the system described herein, $N_{brush,max} = N_{brush,max} x_{ROP}$ ($x_{ROP}$=conversion of ROP) where $x_{ROP}$ is typically <0.8 due to the loss of living of ROP at high conversions.

$$1 = \frac{(N_{bb} - N_{bb,max})^2}{N_{bb,max}^2} + \frac{N_{brush}^2}{(N_{brush,F})^2}$$

$x_{ROP}$=Conversion of ROP at end of synthesis
$N_{brush,F}$=Instantaneous brush length when $N_b = N_{bb,max}$
Plug $N_{brush}$ and $N_{bb}$ into the constraint.

$$1 = \frac{\left(\frac{N_{bb,max}}{V_1}\int_0^t v_o dt - N_{bb,max}\right)^2}{N_{bb,max}^2} + \frac{(N_{brush,max}[1 - \exp(-K_{ROP}t)])^2}{(N_{brush,F})^2}$$

Simplify and isolate flow rate integral $$\{N_{brush,F} = N_{brush,max} x_{ROP}\}$$

$$\left(\frac{1}{V_1}\int_0^t v_o dt - 1\right)^2 = 1 - \frac{(1 - \exp(-K_{ROP}t))^2}{(x_{ROP})^2}$$

$$\int_0^t v_o dt = V_1 \pm V_1^2 \sqrt{1 - \frac{(1 - \exp(-K_{ROP}t))^2}{(x_{ROP})^2}}$$

$$v_o = \left|\frac{V_1}{\frac{\exp(K_{ROP}t_{delay})}{x_{ROP}^-}}\right| \left(\frac{K_{ROP}\left(\frac{2\exp(K_{ROP}t_{delay})x_{ROP} - }{2\exp(K_{ROP}) + 1}\right) - \exp(2K_{ROP}t_{delay})(x_{ROP} - 1)}{2\left(\frac{\exp(K_{ROP}t) + }{\exp(K_{ROP}t_{delay})}\right)\left(\frac{2\exp(K_{ROP}t)}{\exp(K_{ROP}t_{delay})x_{ROP} - } + 1\right) + \exp(K_{ROP}t_{delay})}\right) - K_{ROP}\exp(-K_{ROP}t)\sqrt{\left(\frac{\exp(K_{ROP}t) + }{\exp(K_{ROP}t_{delay})}\right)\left(\frac{2\exp(K_{ROP}t_{delay})x_{ROP} - }{2\exp(K_{ROP}t_{delay}) + 1}\right) + \exp(K_{ROP}t_{delay})}\right)$$

Differentiate with respect to time, and take the negative component $$v_o = V_1 \frac{K_{ROP}}{x_{ROP}}\left(\exp(-K_{ROP}t)2\sqrt{(x_{ROP}^2 - 1) + \frac{\exp(2K_{ROP}t)}{2\exp(K_{ROP}t) - 1}} - \frac{\exp(k_{ROP}C_{N0}C_{DBU}t)}{2\sqrt{(x_{ROP}^2 - 1) + \frac{\exp(2K_{ROP}t)}{2\exp(K_{ROP}t) - 1}}}\right)$$

Concave Elliptical Cone:

Constraint: Equation for an ellipse centered at (0, $N_{brush,F}$) with an x-axis length of $2*N_{bb,max}$ and y-axis length of $2*(N_{brush,F} - N_{brush,I})$, ($N_{brush,I}$=instantaneous brush length when the syringe pump begins). For this synthesis a predetermined final and initial brush length is required. The additions of an initial brush is required due to two factors. First, there is a 5-minute delay from the start of the polymerization to the initial start of the flow because it take time to fill the syringe with the polymerization solutions, and install it into the syringe pump. This delay also occurs in the other bottlebrush synthesis, can be ignored because it has little effect on the produced shape. For the concave elliptical cone, there is an extremely high flow rate at early time points, thus delay significantly affect the shape of the bottlebrush. There for the additions of $N_{brush,I}$ allows for us to account for the delay. The rate study of ROP provides the information to calculate $N_{brush,I}$.

$$1 = \frac{N_{bb}^2}{N_{bb,max}^2} + \frac{(N_{brush} - N_{brush,F})^2}{(N_{brush,F} - N_{brush,I})^2}$$

$t_{delay}$=Time it takes to set up the syringe pump (min)
$N_{brush,I}$=Instantaneous brush length when the syringe pump begins Plug $N_{brush}$ and $N_{bb}$ into the constraint.

$$1 = \frac{\left(\frac{N_{bb,max}}{V_1}\int_0^t v_o dt\right)^2}{N_{bb,max}^2} + \frac{(N_{brush,max}[1 - \exp(-K_{ROP}t)] - N_{brush,F})^2}{(N_{brush,F} - N_{brush,I})^2}$$

Simplify and isolate flow rate integral $$\{N_{brush,I} = N_{brush,max}(1 - \exp(-K_{ROP}t_{delay}))\}$$

$$1 = \left(\frac{1}{V_1}\int_0^t v_o dt\right)^2 + \frac{([1 - \exp(-K_{ROP}t)] - x_{ROP})^2}{(x_{ROP} - 1 - \exp(-K_{ROP}t_{delay}))^2}$$

$$\int_0^t v_o dt = V_1 \pm V_1^2 \sqrt{1 - \frac{([1 - \exp(-K_{ROP}t)] - x_{ROP})^2}{(x_{ROP} - 1 - \exp(-K_{ROP}t_{delay}))^2}}$$

Differentiate with respect to time $$v_o = K_{ROP}\exp(-K_{ROP}t)\sqrt{\left(\frac{\exp(K_{ROP}t) + }{\exp(K_{ROP}t_{delay})}\right)\left(\frac{2\exp(K_{ROP}t_{delay})x_{ROP} - }{2\exp(K_{ROP}t_{delay}) + 1}\right) + \exp(K_{ROP}t_{delay})}$$

Example 10. Matlab Code for the Mathematical Model

A MATLAB code was written to calculate important quantities of interest (molecular weight, lactide conversions, etc.). It was also a way to confirm that no mathematical errors were made during the derivations of the above equations.

The model implements a fourth Order-Runge Kutta method to solve the system of ordinary differential equations derived in the previous sections. The derived flow rate equations are implemented in the model to calculate the concentration of lactide and norbornene in both the syringe as well as the ROMP pot.

Equations for Quantities of Interest:
Conversion of Lac in the total system (Con_Lac)

$$Con_{Lac} = 1 - \frac{\text{mmol } Lac \text{ system}}{\text{mmol } Lac \text{ system initially}} = 1 - \frac{C_{L1}V_1 + C_{L2}V_2}{C_{L0}V_{1,0}}$$

Conversion of Lac in the ROP pot (Con_Lac2)

$$Con_{Lac,2} = 1 - \frac{\text{mmol } Lac \text{ ROP pot}}{\text{mmol } Lac \text{ system intially}} = 1 - \frac{C_{L1}V_1}{C_{L0}V_{1,0}}$$

Conversion of Nor in the total system (Con_Nor)

$$Con_{Nor} = 1 - \frac{\text{mmol } Nor \text{ system}}{\text{mmol } Nor \text{ system initially}} = 1 - \frac{C_{N1}V_1 + C_{N2}V_2}{C_{N0}V_{1,0}}$$

Conversion of Nor in the ROMP pot (Con_Nor2)

$$Con_{Nor,2} = 1 - \frac{\text{mmol } Nor \text{ ROMP}}{\text{mmol } Nor \text{ system intially}} = 1 - \frac{C_{N2}V_2}{C_{N0}V_{1,0}}$$

Fraction of unreacted lactide to polymerized lactide in ROMP pot (Lac_buildup)

$$Lac_{buildup} = \frac{\text{Unreacted } Lac \text{ in } ROMPpot}{Lac \text{ in(polymer and unreacted)}} = \frac{C_{L2}V_2}{C_{L0}(V_{1,0} - V_1)}$$
the ROMP pot Backbone length (bb_length)

$bb_{length} = Con_{Nor}N_{bb,max}$

Instantaneous brush length (arm_length)

$arm_{length} = Con_{Lac2}N_{arm,max}$

Average brush length (arm_length_avg)

$$arm_{lengthavg} = \frac{\int_0^{N_{bb}} N_{arm} dN'_{bb}}{N_{bb}} \approx \frac{\frac{N_{arm,i} + N_{arm,i-1}}{2}(N_{bb,i} - N_{bb,i-1})}{N_{bb}}$$

Trapezoidal rule is applied to approximate the integration, where 'i' an iteration over an ODE time step.

Instantaneous $M_n$ of brush in g/mol (Mn_arm)

$Mn_{arm} = Con_{Lac2}Mn_{arm,max} + MW_{nor}$

Average $M_n$ of brush in g/mol (Mn_arm_avg)

$Mn_{arm\ avg} = arm_{length\ avg} * MW_{PLA\ repeat\ unit} + MW_{nor}$ $M_n$ of the shaped bottlebrush in g/mol (Mn_bb)

$Mn_{bb} = bb_{length}Mn_{arm\ avg}$

Example 11. $^1$H NMR Sensitivity Experiments for Residual Macromonomer

NMR was used to calculate the conversion of macromonomers and to determine the sensitivity limits of the disclosed procedure, as the signals of interest were of very low intensity.

The procedure for determining the conversion of macromonomers involves taking a 0.1 ml aliquot of the crude quenched bottlebrush reaction mixture and diluting it with 0.55 ml of CDCl$_3$. The entirety of this solution is then transferred into an NMR tube, and a $^1$H NMR is obtained with 64 scans and a relaxation time of 10 sec.

To determine the sensitivity limits of $^1$H NMR, the above procedure was mimicked by making NMR samples that had 0.1 ml of THF in 0.6 ml CDCl$_3$ and various moles of nor2. Then $^1$H NMR was recorded with the same instrument under the same acquisition parameters as the bottlebrush aliquots. The signal to noise was calculated for each NMR by looking at the proton signals of the double bond of nor2 (6.04 ppm signal) and comparing it to the baseline. The threshold was set for a useful signal to noise ratio of 3 which correlated to a detection limit of $2.63 \times 10^{-5}$ M $\rightarrow 1.71 \times 10^{-5}$ mmol of nor2 in 0.65 ml.

To correlate the sensitivity limits of $^1$H NMR back to a bottlebrush synthesis, further calculations relating the molar limit of the NMR back to the aliquot taken from the reaction mixture was required. The following calculations are for the bottlebrush kinetics experiment (see Example 6).

Aliquots size: 0.1 ml $\rightarrow 1.71 \times 10^{-4}$ M limit of detection in THF polymerization aliquot Volume of ROMP flask changes over time (3 ml to 23 ml) which changes the detection limit.

Detection limit for 3 mL ROMP vessel (beginning of polymerization): $5.12 \times 10^{-4}$ mmol Detection limit for 3 mL ROMP vessel (beginning of polymerization $3.93 \times 10^{-3}$ mmol Norbornene in the system initially: 0.244 mmol $$Nor\text{ Conv. }(NMR) = 1 - \frac{\text{mmol } Nor\ ROMP}{\text{mmol } Nor \text{ system intially}}$$

Beginning of polymerization:

$$Nor\text{ Conv. }(NMR) = 1 - \frac{5.12 \times 10^{-4} \text{ mmol}}{0.244 \text{ mmol}} = 99.8\%$$

End of polymerization:

$$Nor\text{ Conv. }(NMR) = 1 - \frac{3.93 \times 10^{-3} \text{ mmol}}{0.244 \text{ mmol}} = 98.4\%$$

As no norbornene double bond signals were detected, the macromonomer conversion is therefore greater than 98.4% throughout the process.

Example 12. AFM Images

Calculations to Estimate the Size of Norbornene and Lactide Repeat Units $$\frac{\text{opposite}}{\text{hypotenuse}} = \sin(\text{angle}) \rightarrow \frac{\text{opposite}}{0.154 \text{ nm}} = \sin\left(\frac{109.5}{2}\right)$$

opposite = 0.126 nm 5 bonds for every norbornene repeat unit = 0.63 nm $N_{bb} = 500 \Rightarrow l_o = 315$ nm PLA bond lengths and angles obtained from literature.(9)

$a + b + c = °180$ $\sin(a) = \frac{W}{X}$ $\sin(b) = \frac{W}{Y}$ $\sin^{-1}\left(\frac{W}{X}\right) + \sin^{-1}\left(\frac{W}{Y}\right) + c = °180$ $X = 0.146$ nm, $Y = 0.131$ nm, $c = 118\ deg$ $W = 0.0711$ nm $Z' = \sqrt{X^2 - W^2}$   $Z' = 0.128$ nm $Z'' = \sqrt{Y^2 - W^2}$   $Z'' = 0.111$ nm The lactide repeat is 0.365 nm $N_{arm} = 100 \rightarrow l_o = 36.5$ nm The arms fan out on both sides; therefore, the width is expected to be 73 nm.

Figure 10:
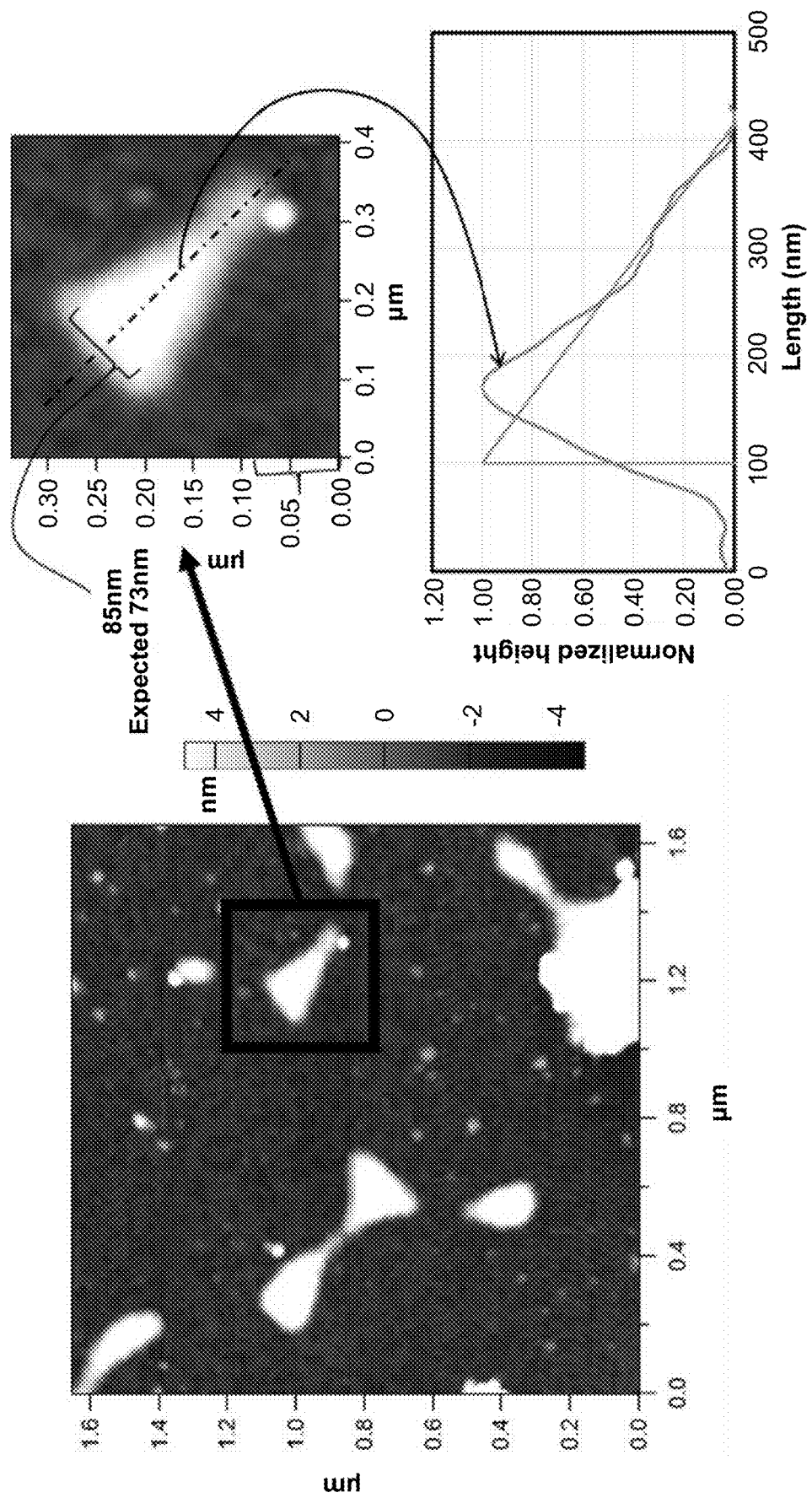
FIG. 10. AFM height maps for PLA cone bottlebrush on silicon surface. The blue line in the plot is the theoretical shape profile for the imaged bottlebrush.
Figure 11:
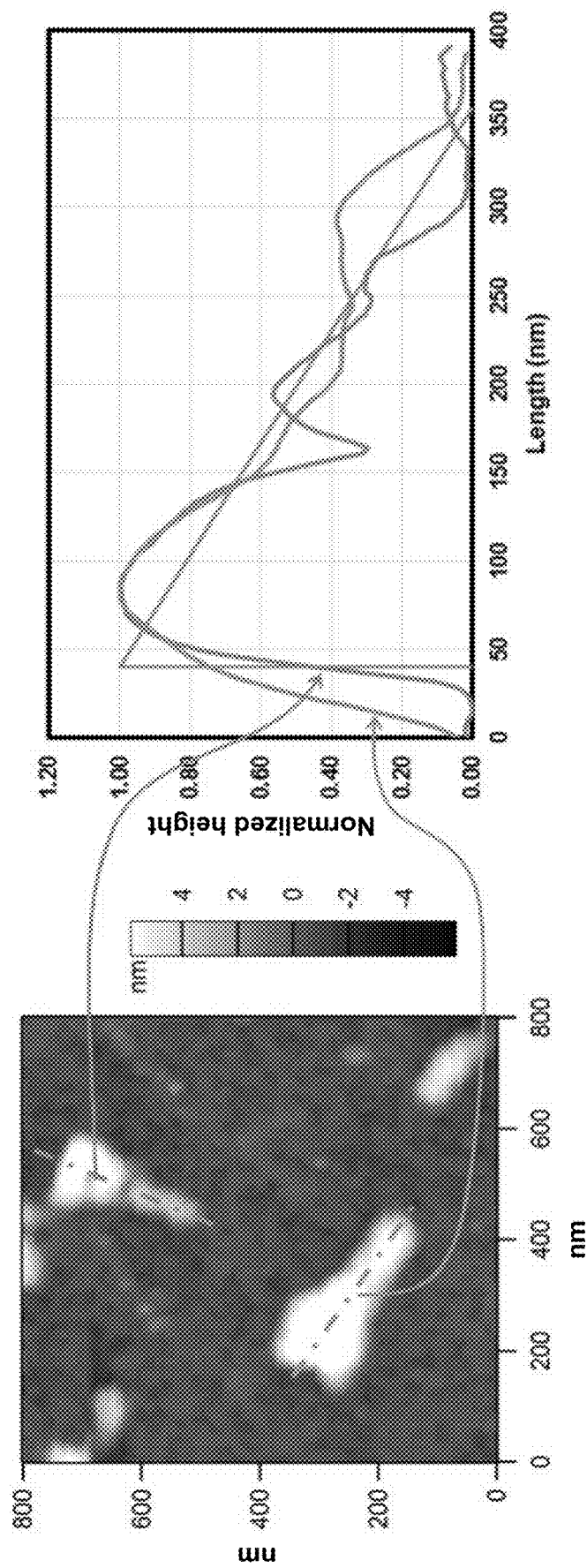
FIG. 11. AFM height maps for PLA cone bottlebrush on silicon surface. The blue line in the plot is the theoretical shape profile for the imaged bottlebrush.

Sample Preparation (FIG. 10 and FIG. 11)

Samples were prepared by spin casting dilute solutions (ca. 0.002 mg/mL) in chloroform onto freshly cleaned Si wafers. A PLA cone bottlebrush with a backbone length of 500 units and an arm length of 100 repeat units was used for all the following images.

Example 13. Ring Opening Polymerization of Lactide in Flow System

Representative Control Procedure for ROP of Lactide with DBU in the Flow System

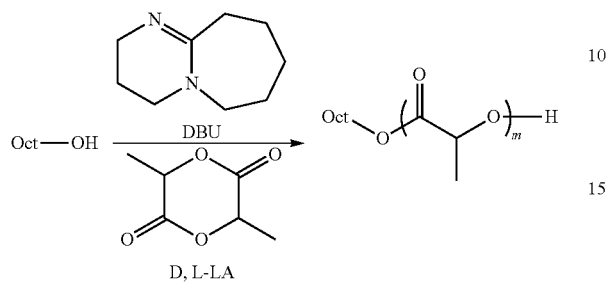

In a glovebox, two solutions were generated in oven-dried glass vials:
1. lactide (1.5 g, 10.4 mmol, 0.9 mL*), octanol (19.4 mg, 0.149 mmol), 10.4 mL of THF
2. DBU (50 mg, 0.328 mmol), 1.03 mL THF.

To setup up the flow system, a 10 mL glass syringe was filled with the lactide solution, and a 2.5 mL glass syringe was filled with the DBU solution. The entire flow setup was taken out of the glovebox, placed into the computer-controlled syringe pumps. Once the syringe pumps were set up, the syringe pumps were activated through the computer according to the appropriate shape equation. Once liquid began exiting the PFR, samples were taken and analyzed by GPC.

Notes:
*The effective volume of dissolved monomer in a 0.9 M THF solution (0.0865 ml of THF/mmol of lactide).

Example 14. Shaped Bottlebrush Synthesis in Flow System

Figure 12:
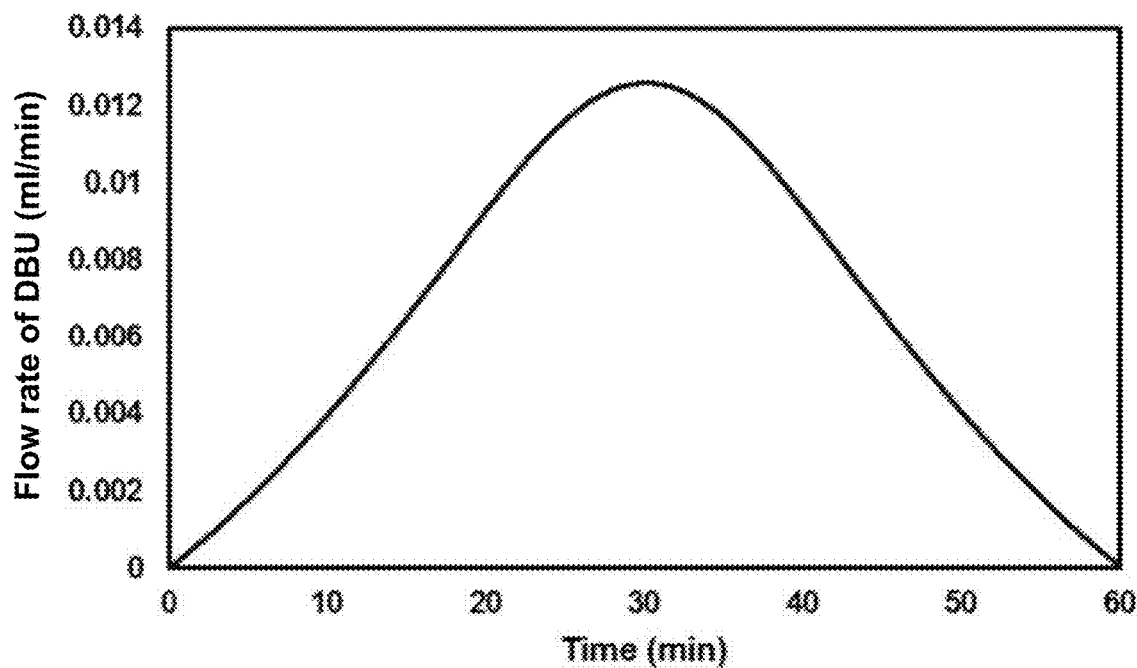
FIG. 12. Plot of flow rate versus DBU for a football bottlebrush synthesis. Defining Equation: $N_{arm}=-0.007 N_{bb}^2+1.4N_{bb}$.
Figure 13:
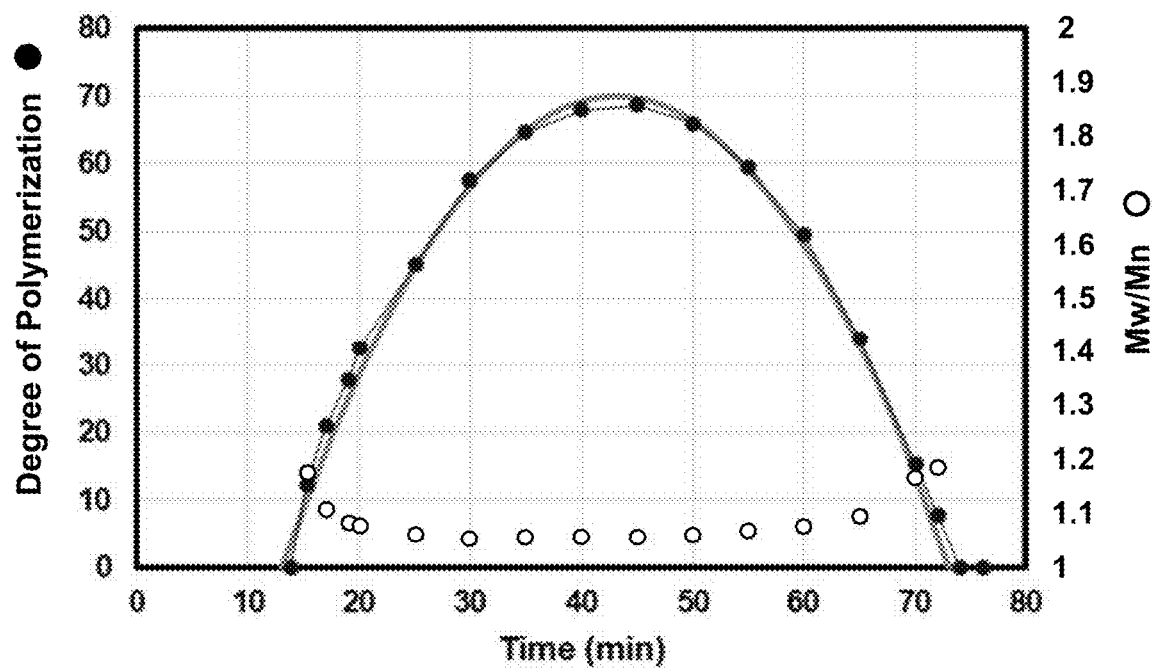
FIG. 13. Plot of theoretical (line) versus experimental (upper dots) brush length for the synthesis of a football bottlebrush synthesis. Mw/Mn plot shown by lower dots.

General Procedure for the Synthesis of Shaped Bottlebrush Polymers (FIG. 12 and FIG. 13)

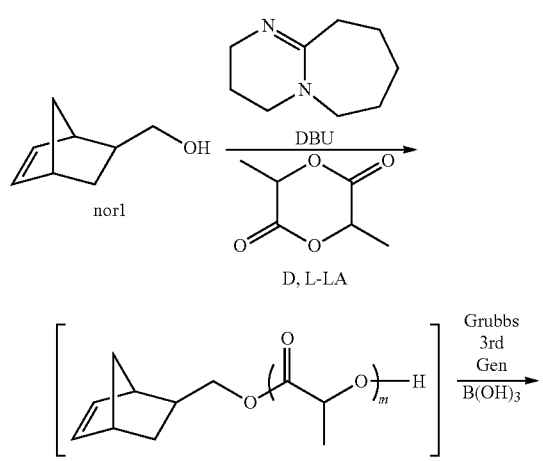

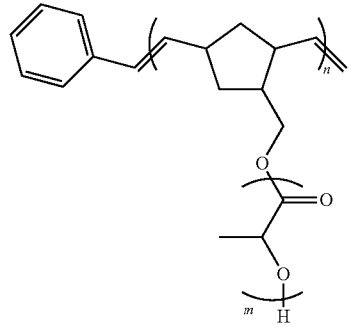

In a glovebox, three solutions were generated in oven-dried glass vials:
1. lactide (1.5 g, 10.4 mmol, 0.9 mL*), nor1 (18.5 mg, 0.149 mmol), 10.4 mL of THF
2. DBU (50 mg, 0.328 mmol), 1.03 mL THF
3. **B(OH)$_3$ (130 mg, 2.1 mmol), G3 (0.44 mg, 0.493 µmol) 4 mL of THF (20 mL vials with TFE septa)

A representative reactor consists of two glass syringes, a PFR (PEEK tubing) and a 20 ml vial (FIG. 1B). To setup up the flow system, a 10 mL glass syringe was filled with the lactide solution, a 2.5 mL glass syringe was filled with the DBU solution, and the outlet of the PFR was pushed through the septa of the B(OH)$_3$ 20 mL vial. The entire flow setup was taken out of the glovebox, placed into the computer-controlled syringe pumps, and an argon line was added to the B(OH)$_3$ vial. Once the syringe pumps were set up, the syringe pumps were activated through the computer according to the appropriate shape equation. Upon completion of the addition, a large excess of ethyl vinyl ether (large excess with respect to [Ru]) was added to the reaction mixture. The reaction mixture was then poured into 300 mL of methanol and a centrifuge was used to isolate the resulting polymer. The polymer was dried under vacuum (Table 13).

Notes:
*The effective volume of dissolved monomer in a 0.9 M THF solution (0.0865 ml of THF/mmol of lactide).
**In order to get B(OH)$_3$ to dissolve into THF, the solution was heated to ~110° C. till all the B(OH)$_3$ dissolved and allowed to cool slowly back to room temperature before use. Some B(OH)$_3$ will drop out of solution. Once at room temperature, G3 was added to the mixture.

TABLE 13

| Data for shaped bottlebrush synthesis (FIG. 9E) | | | | |
|---|---|---|---|---|
| Shape | $M_n$ (kg/mol)[a] | $M_w/M_n$[a] | Lactide Buildup[b] | Unreacted Macromolecules[b] |
| Hourglass | 297 | 1.06 | 66% | >1% |
| Football | 241 | 1.08 | 65% | >1% |

[a]Calculated from GPC with respect to polystyrene standards.
[b]Calculated from NMR.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A method of preparing a bottlebrush copolymer comprising:
   a) growing a macromonomer in a first mixture, wherein the macromonomer is covalently bonded to a ring-strained cyclic olefin, the macromonomer is formed via a controlled polymerization (CP), and the macromonomer has a molecular weight that grows with time;
   b) feeding the first mixture into a second mixture via a semi-batch process, wherein the second mixture comprises a ROMP catalyst and a CP quenching agent, and the first and second mixture form a living copolymer via grafting-through ring opening olefin metathesis polymerization (ROMP); and
   c) quenching the living copolymer thereby providing a bottlebrush copolymer having a bottlebrush architecture;
   wherein the molecular weight of the macromonomer continues to grow until it is quenched by the CP quenching agent, and the living copolymer has a molecular weight that continues to grow when fed the macromonomer.

2. The method of claim 1 wherein the first mixture comprises a ring-strained cyclic-olefin monomer having a nucleophile, and an electrophilic monomer thereby forming the macromonomer.

3. The method of claim 2 wherein the olefinic ring-strained cyclic monomer comprises norbornene.

4. The method of claim 1 wherein the rate of feeding the first mixture into the second mixture determines the architecture of the bottlebrush copolymer.

5. The method of claim 1 wherein the ratio $k_{obs}$ for ROMP to $k_{obs}$ for CP is about or greater than 10.

6. The method of claim 1 wherein the first mixture comprises a CP catalyst or a CP base.

7. The method of claim 6 wherein the CP catalyst comprises a basic nitrogen.

8. The method of claim 2 wherein the electrophilic monomer is a lactone, a siloxane, a styrene, a methacrylate, 2-alkoxy-1,3,2-dioxaphospholane 2-oxide, or an epoxide.

9. The method of claim 2 wherein a mixture comprising another macromonomer feeds into the second mixture simultaneously with the first mixture, or sequentially after the first mixture.

10. The method of claim 1 wherein the bottlebrush architecture has an axisymmetric shape, or the bottlebrush architecture has a monotonic axisymmetric shape.

11. The method of claim 1 wherein the bottlebrush architecture is cylindrical, conical, ellipsoidal, concave elliptical, or football shaped.

12. The method of claim 1 wherein the bottlebrush copolymer has a dispersity index of about 1.01 to about 1.25.

13. The method of claim 1 wherein the CP quenching agent is a boronic acid, an alkylhalosilane, or an alcohol.

14. The method of claim 1 wherein the ROMP catalyst comprises a transition metal carbene complex.

15. The method of claim 14 wherein the ROMP catalyst is a Grubbs ruthenium catalyst or a Schrock catalyst.

16. The method of claim 1 wherein the controlled polymerization is an anionic polymerization or a ring opening polymerization.

17. A method of preparing a bottlebrush copolymer comprising:
   a) contacting a first mixture of monomers with a varying amount of an CP catalyst in a plug-flow reactor to form a macromonomer, wherein the macromonomer is covalently bonded to a ring-strained cyclic olefin, and the macromonomer is formed via a controlled polymerization (CP);
   wherein the amount of CP catalyst that contacts the first mixture is increased or decreased at the time during contact;
   b) allowing the macromonomer to grow wherein the molecular weight of the macromonomer is dependent on the amount of the CP catalyst contacting the first mixture at the time during contact while traversing the reactor, thereby forming macromonomers having different molecular weights at different points in time;
   c) feeding macromonomers from the reactor into a second mixture via a semi-batch process wherein the second mixture comprises a ROMP catalyst and a CP quenching agent, and first and second mixture form a living copolymer via grafting-through ring opening olefin metathesis polymerization (ROMP); and
   d) quenching the living copolymer thereby providing a bottlebrush copolymer having a bottlebrush architecture;
   wherein the molecular weight of the macromonomer continues to grow until it is quenched by the CP quenching agent, and the living copolymer has a molecular weight that continues to grow when fed the macromonomer.

18. The method of claim 17 wherein the first mixture comprises a norbornene monomer having a nucleophile, and an electrophilic monomer; and wherein the CP catalyst is 1,8-diazabicyclo[5.4.0] undec-7-ene (DBU), and the ratio $k_{obs}$ for ROMP to $k_{obs}$ for CP is about or greater than 10 $\text{min}^{-1}$.

* * * * *